US009814257B2

(12) United States Patent
Lee

(10) Patent No.: US 9,814,257 B2
(45) Date of Patent: Nov. 14, 2017

(54) FRAME FOR MAIN BODY OF UPPER DRIVING TYPE JUICE EXTRACTOR, AND FRAME ASSEMBLY USING THE SAME

(71) Applicant: HappyCall Co., Ltd., Gimhae-si, Gyeongsangnam-do (KR)

(72) Inventor: Hyun sam Lee, Busan (KR)

(73) Assignee: HappyCall Co., Ltd., Gimhae-si, Gyeongsangnam-do (KR)

( * ) Notice: Subject to any disclaimer, the term of this patent is extended or adjusted under 35 U.S.C. 154(b) by 140 days.

(21) Appl. No.: 14/554,421

(22) Filed: Nov. 26, 2014

(65) Prior Publication Data

US 2015/0320104 A1  Nov. 12, 2015

(30) Foreign Application Priority Data

May 12, 2014  (KR) .................. 10-2014-0056113

(51) Int. Cl.
*A23N 1/02* (2006.01)
*A47J 19/02* (2006.01)

(52) U.S. Cl.
CPC .............. *A23N 1/02* (2013.01); *A47J 19/027* (2013.01)

(58) Field of Classification Search
CPC . A23N 1/003; A23N 1/00; A21B 7/005; A47J 43/046; A47J 45/068; A47J 37/0611; A47J 43/24; A47J 19/02; A47J 19/027
USPC ......... 99/509, 510, 511, 512, 348, 492, 342, 99/349, 495, 501, 502, 504, 513
See application file for complete search history.

(56) References Cited

U.S. PATENT DOCUMENTS

| 1,955,975 A | * | 4/1934 | Puterbaugh | ........... A47J 19/027 |
| | | | | 99/503 |
| 2,304,929 A | * | 12/1942 | Keith | .................... A47J 19/027 |
| | | | | 210/374 |

(Continued)

FOREIGN PATENT DOCUMENTS

| CN | 103735143 A | 4/2014 | .............. A47J 19/00 |
| CN | 203709789 U | 7/2014 | .............. A47J 19/02 |

(Continued)

OTHER PUBLICATIONS

Japanese Patent Office, Office Action—Japanese Application No. 2014-239020, dated Aug. 25, 2015, 3 pages.

(Continued)

*Primary Examiner* — David Angwin
*Assistant Examiner* — Jimmy Chou
(74) *Attorney, Agent, or Firm* — Sunstein Kann Murphy & Timbers LLP

(57) ABSTRACT

A frame for a main body of an upper driving type juice extractor includes an upper frame; a lower frame; a connection frame configured to connect the upper frame with the lower frame, wherein the upper frame has a first through-hole and a second through-hole. Further, a frame assembly for a main body of an upper driving type juice extractor includes a frame including an upper frame having a first through-hole and a second through-hole, a lower frame, and a connection frame configured to connect the upper frame with the lower frame; a driving part mounted at an upper portion of the upper frame; and a lifting part installed at the lower frame, wherein a driving shaft of the driving part is inserted in the first through-hole.

4 Claims, 25 Drawing Sheets

(56) References Cited

U.S. PATENT DOCUMENTS

| | | | | |
|---|---|---|---|---|
| 3,186,458 | A * | 6/1965 | Takei | A23N 1/00 74/458 |
| 5,184,544 | A * | 2/1993 | Ling | B01D 11/0273 134/149 |
| 5,221,055 | A * | 6/1993 | Kuan | B01F 13/1041 241/199.12 |
| 5,421,248 | A * | 6/1995 | Hsu | A47J 19/027 241/282.1 |
| 5,592,872 | A * | 1/1997 | Kooyker | A47J 43/085 99/348 |
| 5,704,281 | A * | 1/1998 | Huang | B08B 3/10 134/149 |
| 5,743,176 | A * | 4/1998 | Anderson | A23N 1/00 99/512 |
| 5,819,641 | A * | 10/1998 | Hsu | A47J 19/027 241/282.1 |
| 6,003,318 | A * | 12/1999 | Busick | B67D 1/0869 62/3.64 |
| 6,155,161 | A * | 12/2000 | Chan | A47J 36/16 366/146 |
| 6,299,085 | B1 * | 10/2001 | Ekstrom | A47J 43/0722 241/101.2 |
| 6,595,121 | B1 * | 7/2003 | Chang Chien | A47J 43/0716 241/199.12 |
| 6,748,853 | B1 * | 6/2004 | Brady | A47J 43/0716 241/37.5 |
| 6,796,220 | B2 * | 9/2004 | Lee | A23C 11/103 366/146 |
| 6,827,002 | B1 * | 12/2004 | Lin | A47J 31/42 241/100 |
| 6,837,153 | B1 * | 1/2005 | Chang Chien | A47J 43/0722 241/199.12 |
| 7,063,009 | B2 * | 6/2006 | Lin | A47J 43/0766 366/314 |
| 7,422,361 | B2 * | 9/2008 | Pryor, Jr. | A47J 43/046 366/197 |
| 7,481,155 | B2 * | 1/2009 | Larsen | A47J 19/027 241/37.5 |
| 8,365,657 | B2 * | 2/2013 | Lee | A23N 1/00 241/278.1 |
| 8,578,844 | B2 * | 11/2013 | Holcomb | A47J 42/04 241/92 |
| 8,596,190 | B2 * | 12/2013 | Roysner | A23G 1/042 239/16 |
| 8,826,811 | B2 * | 9/2014 | Kim | A47J 19/025 100/117 |
| 8,905,628 | B2 * | 12/2014 | Ledger | A47J 43/042 366/186 |
| 9,277,764 | B2 * | 3/2016 | Chou | A23N 1/02 |
| 9,474,402 | B2 * | 10/2016 | Cheung | A47J 19/02 |
| 2003/0154867 | A1 * | 8/2003 | Kim | A47J 19/025 99/510 |
| 2006/0021520 | A1 | 2/2006 | Hsu | 99/511 |
| 2007/0209528 | A1 * | 9/2007 | Chang | A47J 43/0722 99/511 |
| 2008/0031087 | A1 * | 2/2008 | Pryor | A47J 43/0716 366/194 |
| 2010/0058939 | A1 * | 3/2010 | Rivera | A47J 19/02 99/501 |
| 2012/0192729 | A1 * | 8/2012 | Huang | A47J 19/027 99/511 |
| 2013/0074708 | A1 * | 3/2013 | Asbury | A23N 1/02 99/513 |
| 2013/0183426 | A1 * | 7/2013 | Ledger | A47J 43/042 426/519 |
| 2014/0299006 | A1 * | 10/2014 | Fleuren | A47J 43/044 99/513 |
| 2016/0120354 | A1 | 5/2016 | Kim et al. | A47J 19/02 |

FOREIGN PATENT DOCUMENTS

| | | | |
|---|---|---|---|
| CN | 203735966 U | 7/2014 | A47J 19/02 |
| CN | 103976633 A | 8/2014 | A47J 19/02 |
| JP | 3721042 B2 | 11/2005 | A47J 19/00 |
| KR | 10-2011-0040803 | 4/2011 | A47J 19/06 |
| KR | 10-1045107 | 6/2011 | A47J 19/06 |
| KR | 10-2013-0098701 | 9/2013 | A47J 16/06 |
| KR | 10-1311995 A | 9/2013 | A47J 19/06 |
| KR | 101311995 B1 * | 9/2013 | |
| WO | WO 2013/020179 A1 | 2/2013 | A47J 43/04 |

OTHER PUBLICATIONS

Japanese Patent Office, Office Action—Japanese Application No. 2014-239020, dated Aug. 25, 2015, 3 pages (English translation).

European Patent Office, Extended European Search Report—Application No. 14195362.0-1656, dated Oct. 12, 2015, 6 pages.

Japanese Patent Office, Office Action—Japanese Application No. 2015-021059852, dated Mar. 30, 2015, 3 pages.

Japanese Patent Office, Office Action—Japanese Application No. 2015-021059852, dated Mar. 30, 2015, 2 pages (English translation).

Russian Patent Office, Official Action—Russian Application No. 2014-147971, dated Nov. 27, 2014, issued Feb. 11, 2016, 4 pages.

Russian Patent Office, Official Action—Russian Application No. 2014-147971, dated Nov. 27, 2014, issued Feb. 11, 2016, 2 pages (English translation).

Chinese Patent Office, Office Action: Chinese Application No. 201410707022.1, dated Oct. 31, 2016, 6 pages.

Chinese Patent Office (English Translation), Office Action: Chinese Application No. 201410707022.1, dated Oct. 31, 2016, 7 pages.

* cited by examiner

FRAME FOR MAIN BODY OF UPPER DRIVING TYPE JUICE EXTRACTOR, AND FRAME ASSEMBLY USING THE SAME

Priority is claimed from Korean Patent Application No. 10-2014-0056113, filed on May 12, 2014, the full disclosure of which is hereby incorporated by reference herein.

Applicant has filed the following related patent applications on the same date as the present application: Ser. No. 14/554,406, entitled "Upper Driving Type Juice Extractor"; Ser. No. 14/554,441, entitled "Upper Driving Type Juice Extractor"; and, Ser. No. 14/554,456, entitled "Upper Driving Type Juice Extractor."

BACKGROUND

1. Technical Field

The present invention relates to a frame for a main body of an upper driving type juice extractor in which the frame is disposed in the main body, and a driving part is mounted at an upper portion of the frame, and a lift part is mounted at a lower portion thereof, such that deformation of the main body is restricted while the juice extractor is operated, and a frame assembly using the same.

2. Description of the Related Art

For example, in Korean patent No. 10-1045107 (the '107 patent) and Korean Patent Publication No. 10-2013-0098701 (the '701 publication) filed by the applicant, conventional upper driving type juice extractors have been proposed.

The upper driving type juice extractors described in the patent documents include an extracting part which separates and discharges juice and residue; a driving part which drives the extracting part; a main body having a driving part mounting body on which the driving part is mounted and an insertion/removal groove body in which an insertion/removal groove configured for the extracting part to be inserted and removed forward and backward therealong is formed; and a lifting part which moves the extracting part up and down using the driving part.

In the '107 patent, a juice discharging port and a residue discharging port are formed in a lower surface of a housing of the extracting part, and all receiving cups are accommodated under the main body.

In the '701 publication, the juice discharging port is formed in the lower surface of the housing of the extracting part, and the residue discharging port is formed in an outer circumferential surface thereof.

In these patent documents, since the juice discharging port is formed in the lower surface of the extracting part, the cup should be accommodated in the main body, and thus the cup may not be clearly seen from an outer side and may overflow.

Further, since the lifting part in the '107 patent and '701 publication is operated in a manual manner in which a lifting protrusion or a ring lever is turned, it is difficult for a user, to operate the lifting part.

Also, the manual operation type lifting part is inconvenient in that the user should detect a degree to which the lifting part is lifted.

Also, in the '107 patent and '701 publication, since an upper side of the insertion/removal groove and an upper surface of the extracting part are spaced from each other, when the extracting part is moved up while a user's finger is inserted therebetween, the finger may be injured.

Also, since the upper driving type juice extractor is rotated and pressed while a screw is pushed, resistance (reaction) against extracted juice is applied up and down, and the main body formed of a plastic material is spread up and down and deformed, and thus durability thereof is lowered.

Also, since a material introducing port is fixed to a cover or the like, the cover is also removed when an internal portion of the material introducing port is washed, and thus it is inconvenient to perform the washing operation.

Also, since the '107 patent does not have a structure in which a lower end of the material introducing port is fitted to the upper surface of the extracting part, the extracted juice may spatter all around, and thus may be introduced into the main body through a gap between the lower end side of the material introducing port and the upper surface side of the extracting part.

Also, since the motor is generally an AC motor with a fixed speed, a speed thereof may not be controlled in multiple stages such as a first speed (for vegetables) and a second speed (for fruits) according to the type of juice (e.g., vegetables or fruits).

Also, because it is an upper driving type, when a driving shaft of the motor and a driven shaft of a screw are located at a position in which they are not engaged with each other, it is inconvenient to turn the driving shaft or the driven shaft to engage them with each other.

Also, when a liquid overflows through a center of the cover, the liquid flows down toward a rear side of the cover, and the main body becomes dirty, thus increasing an area that needs to be washed.

SUMMARY

The present invention is directed to a frame for a main body of an upper driving type juice extractor in which a driving part and a lift part are mounted at upper and lower portions of the frame, such that deformation of the main body is restricted while the juice extractor is operated, and a frame assembly using the same.

According to an aspect of the present invention, there is provided a frame for a main body of an upper driving type juice extractor, including an upper frame; a lower frame; a connection frame configured to connect the upper frame with the lower frame, wherein the upper frame has a first through-hole and a second through-hole.

The connection frame may have a third through-hole, and the lower frame may have a fourth through-hole, and three pins may be formed around a circumference of the fourth through-hole, and a plurality of downward protruding pipes which protrude downward may be installed at an edge of the lower frame.

According to an aspect of the present invention, there is provided a frame assembly for a main body of an upper driving type juice extractor, including a frame including an upper frame having a first through-hole and a second through-hole, a lower frame, and a connection frame configured to connect the upper frame with the lower frame; a driving part mounted at an upper portion of the upper frame; and a lifting part installed at the lower frame, wherein a driving shaft of the driving part is inserted in the first through-hole.

The driving part may include: a reduction gear part installed at the upper portion of the upper frame and having the driving shaft; and a motor supported by the reduction gear part so as to transmit power.

BRIEF DESCRIPTION OF DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF MAIN ELEMENTS

| | |
|---|---|
| 100: main body | 120: front groove |
| 140: rear groove | 1100: frame assembly |
| 1110: frame | 1300: body case |
| 300: driving part | 310: motor (BL motor) |
| 330: reduction gear part | 500: extracting part |
| 510: housing | 530: cover |
| 550: screw | 570: net drum |

-continued

| | |
|---|---|
| 590: rotating brush | 700: lifting part |
| 710: lifting motor | 730: seating part |
| 750: cam part | 770: power transmitting part |
| 790: planet gear | 900: control part |

DETAILED DESCRIPTION OF EMBODIMENTS

Hereinafter, preferred embodiments of the present invention will be described in detail below with reference to the accompanying drawings.

Figure 1:
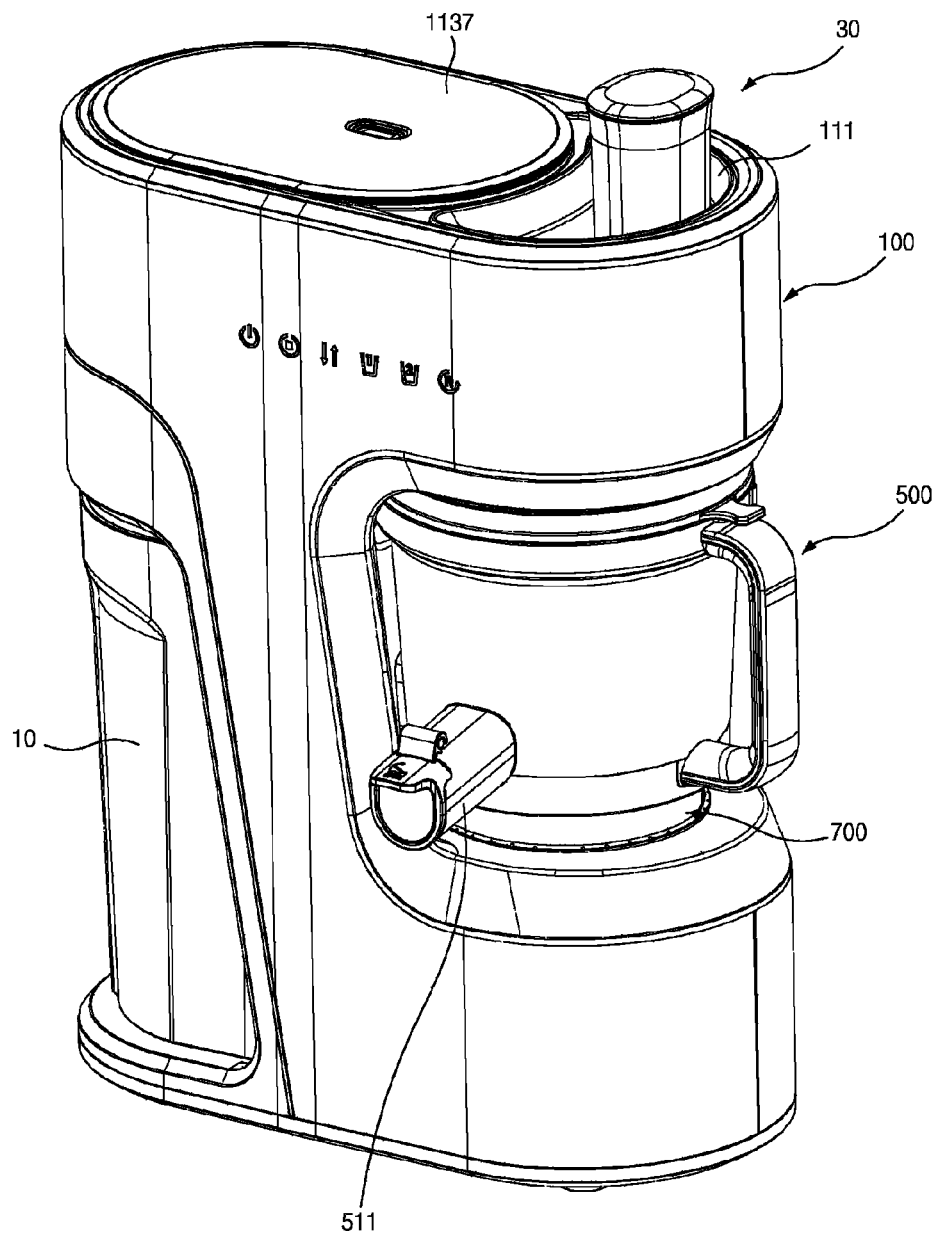
FIG. 1 is a front perspective view of an upper driving type juice extractor according to a preferred embodiment of the present invention.
Figure 2:
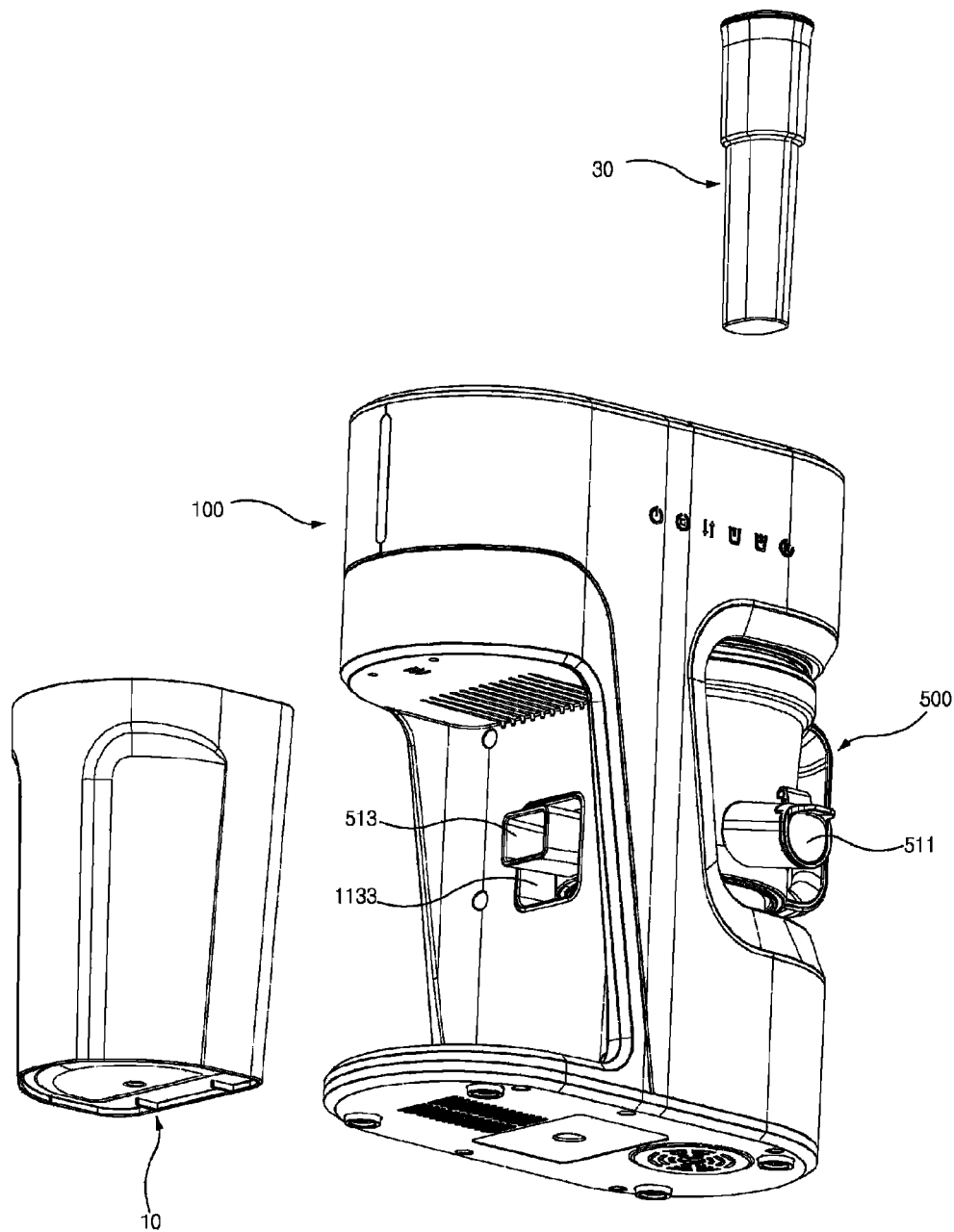
FIG. 2 is a rear perspective view illustrating a state in which a pressing rod and a residue container are separated from FIG. 1.
Figure 3:
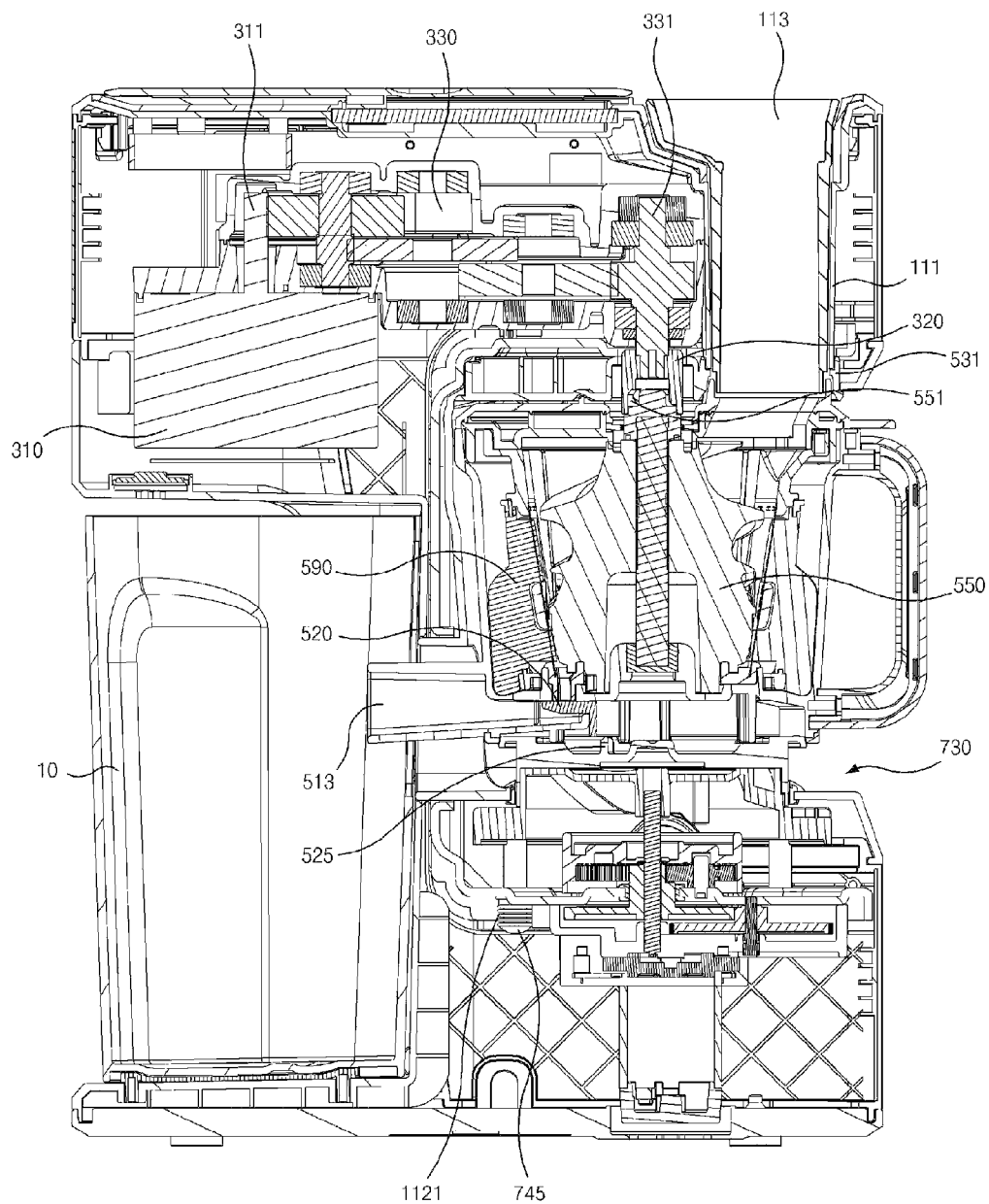
FIG. 3 is a cross-sectional view illustrating a state in which the pressing rod is separated from FIG. 1.

FIG. 1 is a front perspective view of an upper driving type juice extractor according to a preferred embodiment of the present invention, FIG. 2 is a rear perspective view illustrating a state in which a pressing rod and a residue container are separated from FIG. 1, and FIG. 3 is a cross-sectional view illustrating a state in which the pressing rod is separated from FIG. 1.

Referring to FIGS. 1 to 3 and 7, the upper driving type juice extractor according to the embodiment of the present invention includes a main body 100 configured to form an exterior, a driving part 300 disposed at an upper side of the main body 100, an extracting part 500 disposed at a lower side of the main body 100, and a lifting part 700 configured to move the extracting part 500 up and down with respect to the driving part 300. Preferably, the upper driving type juice extractor further comprises a control part 900 configured to control the driving part 300 and the lifting part 700.

Figure 4:
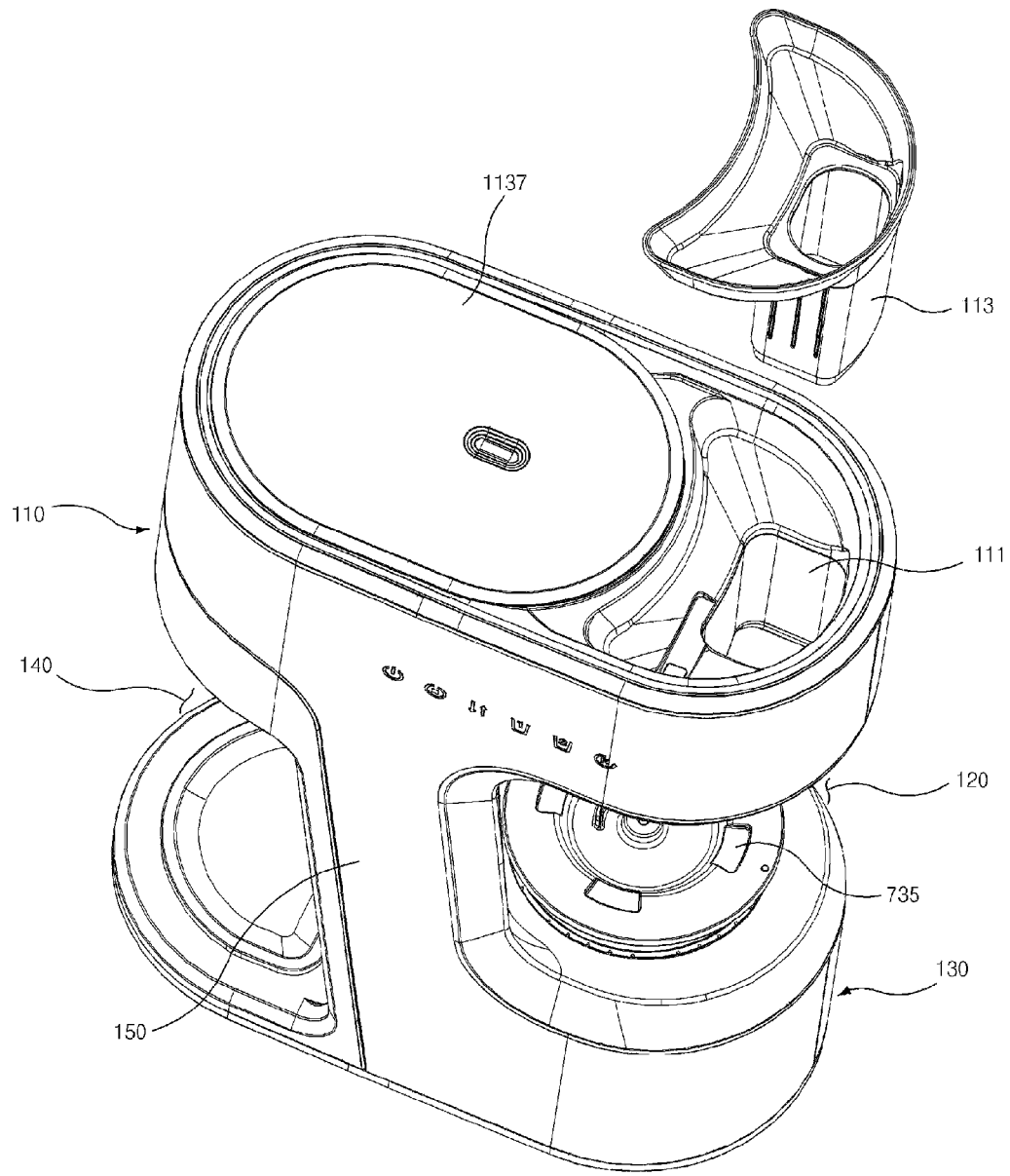
FIG. 4 is a perspective view illustrating a state in which a removable material introducing port is separated from a main body of the upper driving type juice extractor according to the preferred embodiment of the present invention.
Figure 5:
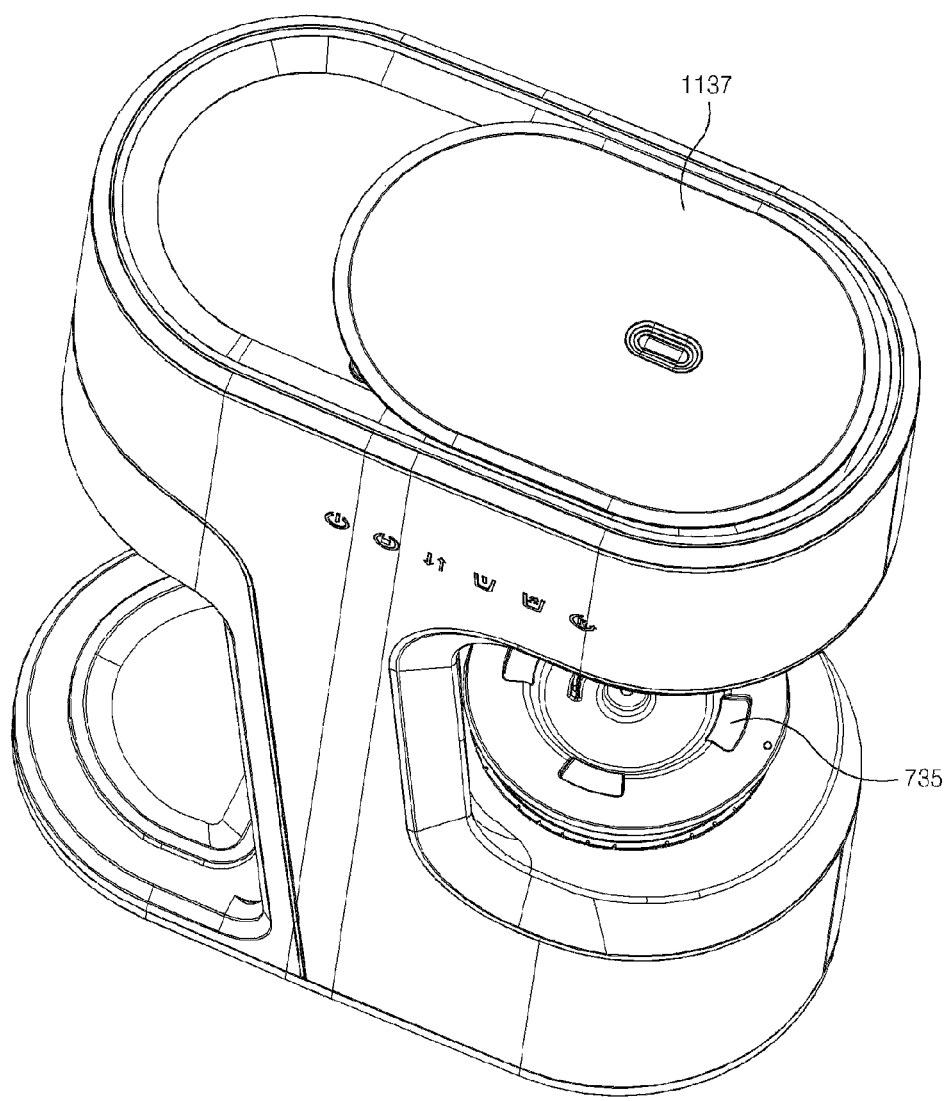
FIG. 5 is a perspective view illustrating a state in which the material introducing port of FIG. 4 is blocked by an opening/closing plate.
Figure 6:
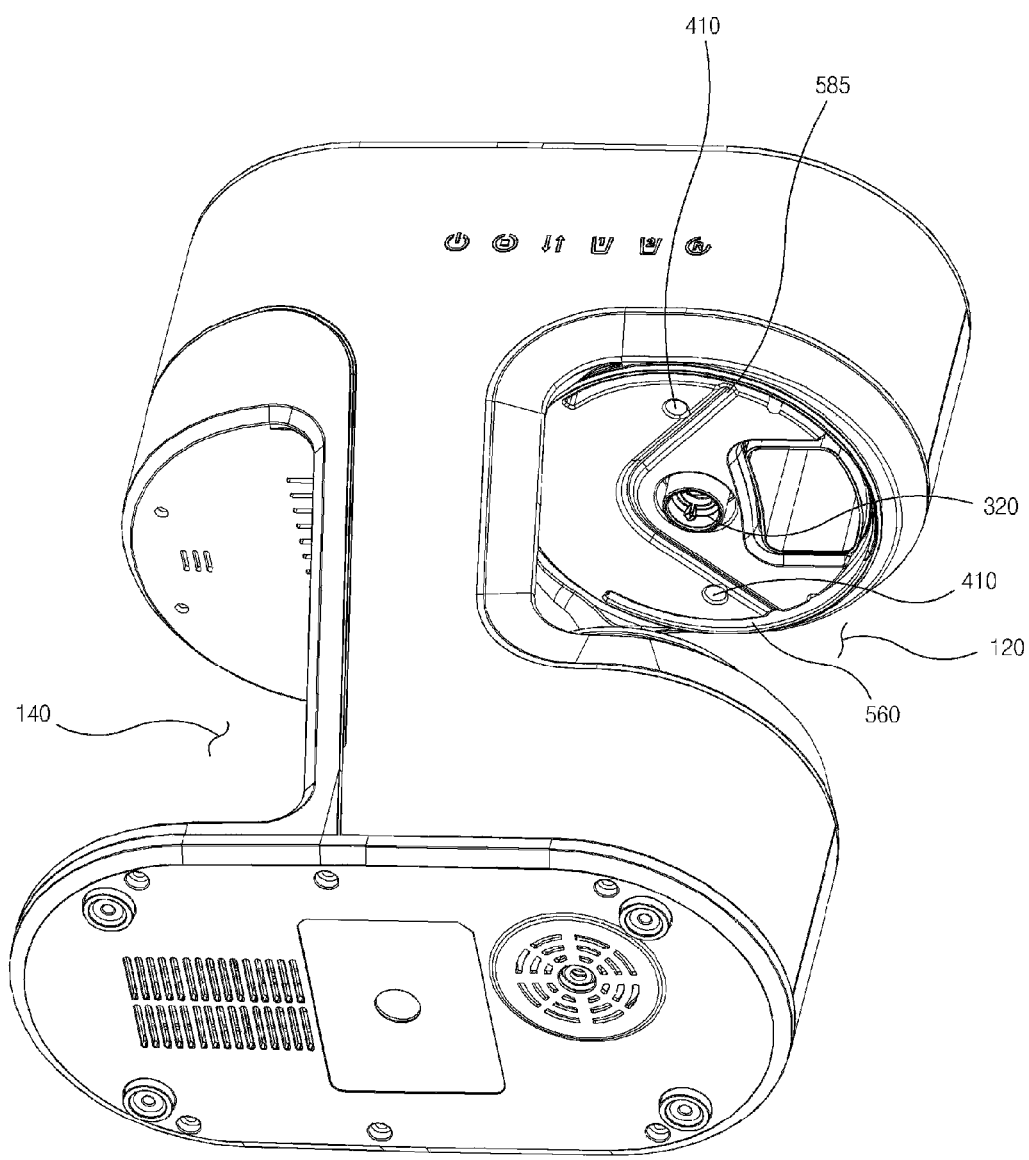
FIG. 6 is a perspective view of FIG. 5 when seen from a lower surface.

As illustrated in FIGS. 4 to 6, the main body 100 is formed into an exact or approximate I shape, and includes a horizontal upper body 110, a horizontal lower body 130, and a center body 150 configured to connect the upper body 110 with the lower body 130. The center body 150 is formed to be vertical or to be inclined.

Figure 7:
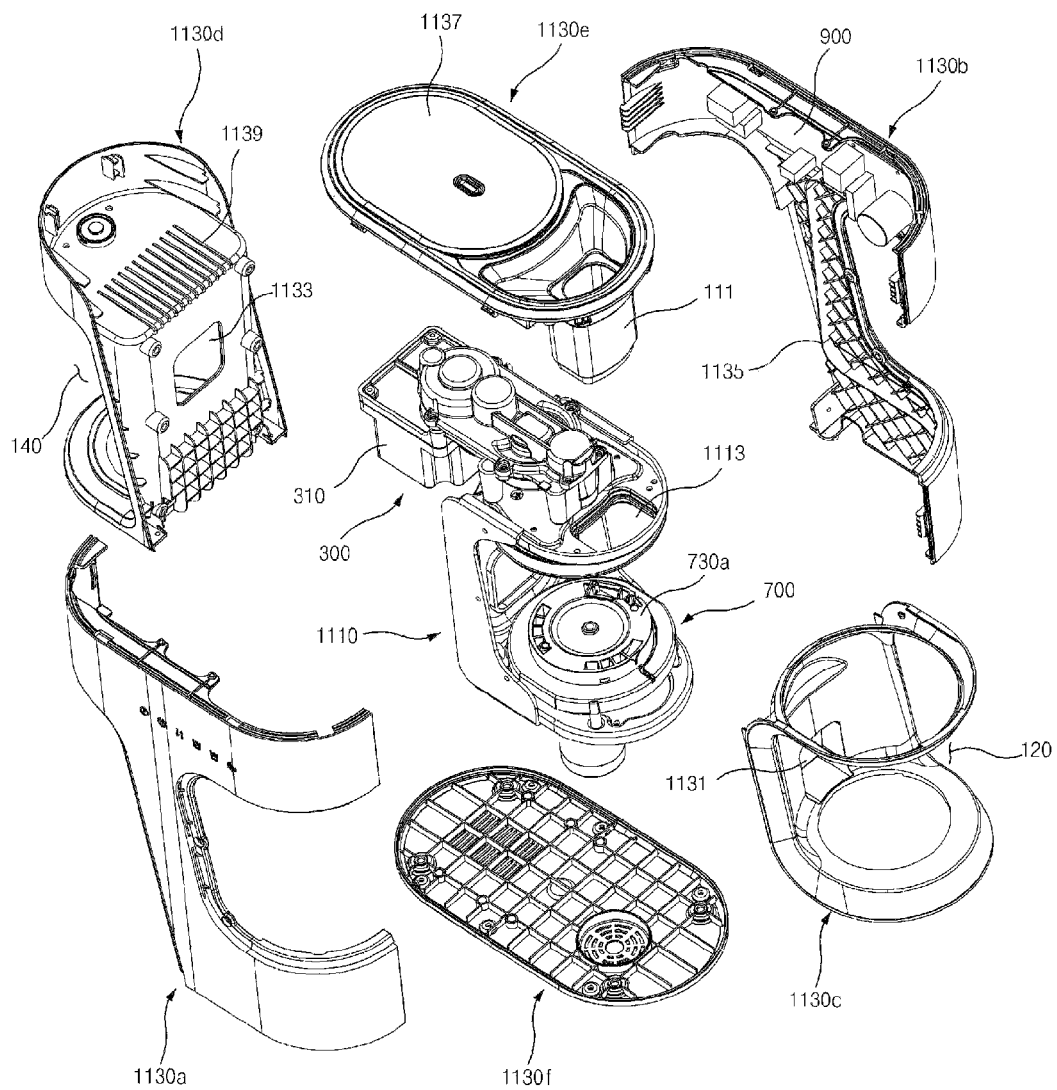
FIG. 7 is a perspective view illustrating a state in which a frame assembly and a cover are separated from the main body.

As illustrated in FIG. 7, the upper body 110 has a material introducing port 111 having a through-hole formed to extend downward from the top. The material introducing port 111 serves as a passage through which a material is inserted into the extracting part 500.

Further, the driving part 300 configured to transmit power to the extracting part 500 is mounted on the upper body 110. The lifting part 700 is installed at the lower body 130.

The center body 150 connects a lower portion of the upper body 110 with an upper portion of the lower body 130, and the upper body 110, the center body 150 and the lower body 130 are generally formed in the I shape.

The center body 150 has an insertion hole 151 formed to pass therethrough from a front to a rear, such that a residue discharging port 513 of the extracting part, which will be described later, is inserted and passes therethrough.

A front portion of the upper body 110, the center body 150, and a front portion of the lower body 130 have a front groove 120 through which the extracting part 500 is inserted and removed.

A rear portion of the upper body 110, the center body 150, and a rear portion of the lower body 130 have a rear groove 140 which a residue container 10 is inserted and removed.

More specifically, as illustrated in FIG. 7, the main body 100 includes a frame assembly 1100 and a body case 1130 configured to surround the frame assembly 1100.

Figure 8:
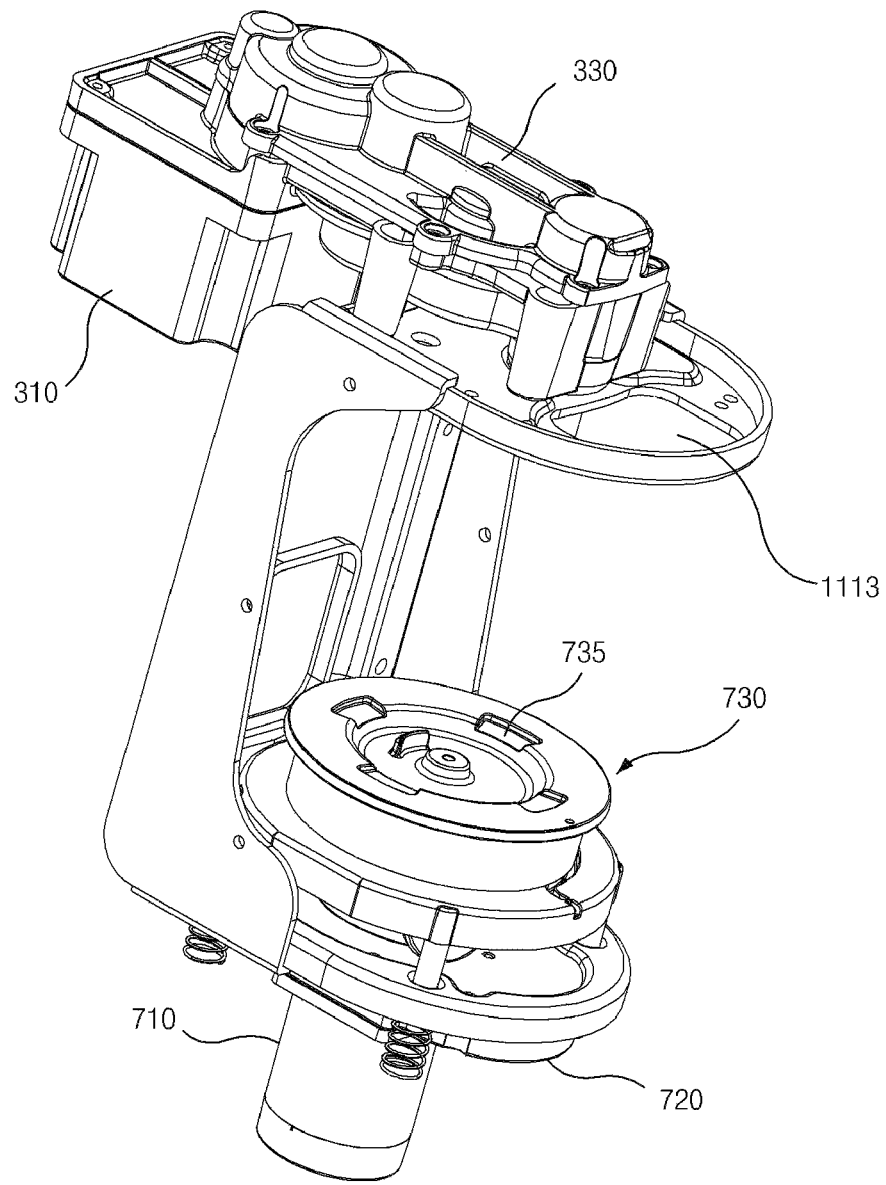
FIG. 8 is a perspective view of the frame assembly.
Figure 9:
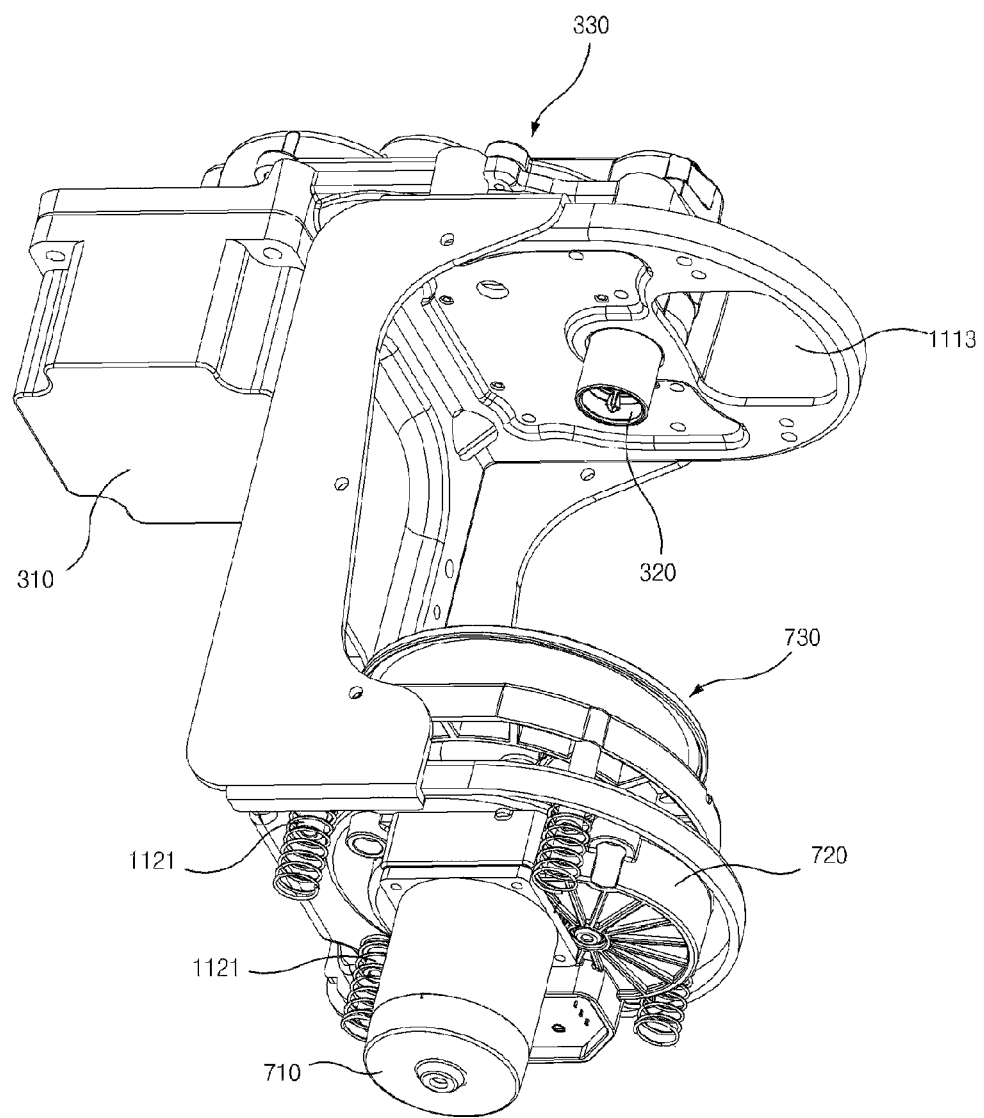
FIG. 9 is a perspective view of the frame assembly of FIG. 8, when seen from a lower surface thereof.

As illustrated in FIGS. 8 and 9, the frame assembly 1100 includes a frame 1110, and the driving part 300 and the lifting part 700 assembled and mounted to the frame 1110.

Figure 10:
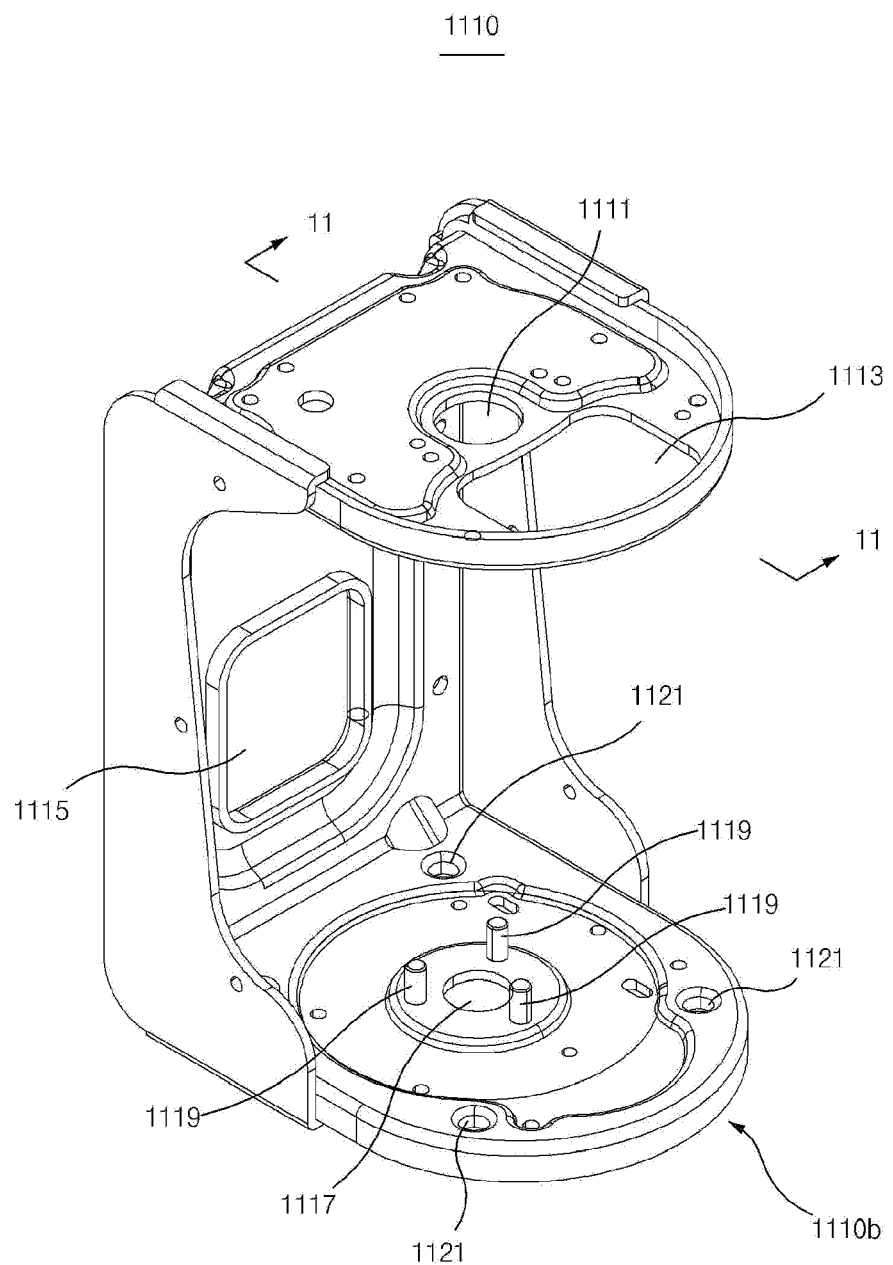
FIG. 10 is a perspective view of a frame.
Figure 11:
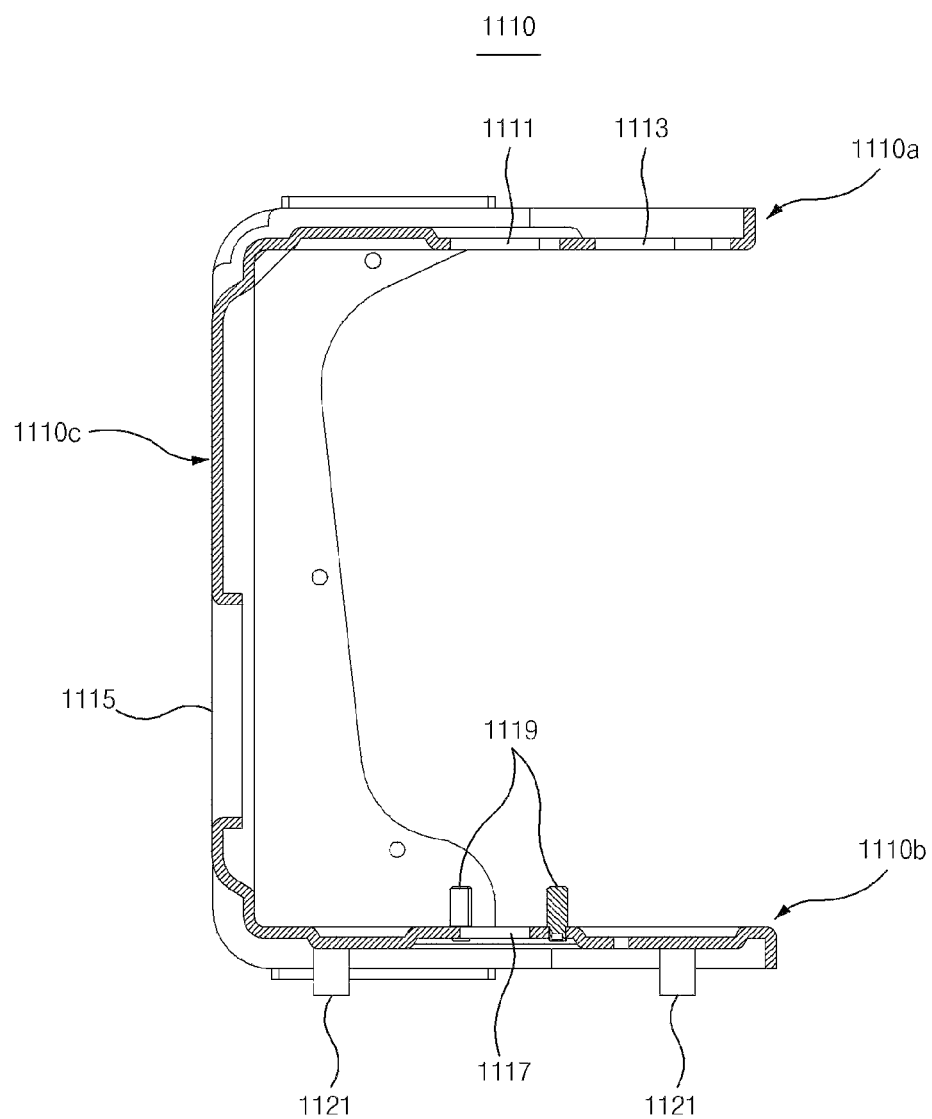
FIG. 11 is a cross-sectional view taken along line 11-11 of FIG. 10.
Figure 12:
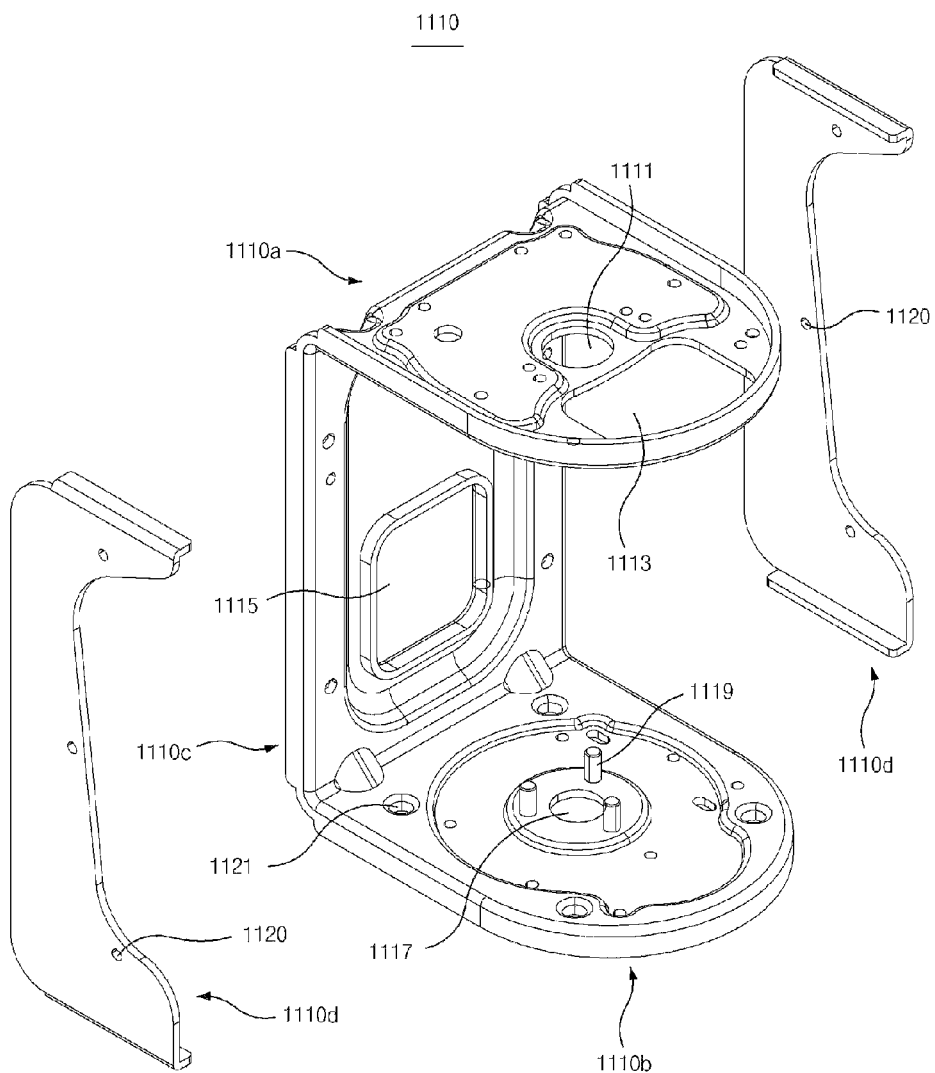
FIG. 12 is a perspective view illustrating a state in which left and right reinforcing members are separated from FIG. 10.

As illustrated in FIGS. 10 to 12, the frame 1110 includes an upper frame 1110a having a first through-hole 1111 in which a driving shaft 320 of the driving part 300 is inserted and a second through-hole 1113 in which the material introducing port 111 is inserted, a lower frame 1110b on which the lifting part 700 is mounted, and a connection frame 1110c configured to connect the upper frame 1110a with the lower frame 1110b and having a third through-hole 1115 in which the residue discharging port 513 is inserted. The lower frame 1110b has a fourth through-hole 1117 in which a rotating shaft 721 of the lifting part 700 is inserted from bottom to top.

The connection frame 1110c serves to connect the rear portion of the upper frame 1110a with the rear portion of the lower frame 1110b and is C-shaped when seen from a side thereof. That is, the upper and lower frames 1110a and 1110b are disposed horizontally, and the connection frame 1110c is disposed vertically.

Three pins 1119 are formed to protrude from a circumferential surface of the fourth through-hole 1117.

A plurality of, e.g., four, downward protruding pipes 1121 are formed at an edge of the lower frame 1110b to protrude downward.

That is, the frame 1110 is bent to form the C shape. Further, the frame 1110 is formed of a steel material and thus serves to maximally restrict up and down deformation due to the upper driving type.

Further, a reinforcing member 1110d is preferably fixed to both sides of the frame 1110 by welding or the like.

The reinforcing member 1110d has a coupling hole 1120 coupled with a body case 1130 to be described later.

As illustrated in FIG. 11, the body case 1130 includes left and right body cases 1130a and 1130b, front and rear body cases 1130c and 1130d, and upper and lower body cases 1130e and 1130f which cover left and right sides, front and rear sides, and upper and lower sides of the frame 1110.

The left and right body cases 1130a and 1130b are coupled to the left and right sides of the frame 1110.

Each of the left and right body cases 1130a and 1130b includes an upper flange 110, a center flange 130, and a lower flange 130.

In particular, each lower side of the left and right body cases 1130a and 1130b is formed in a flange type which is formed toward a front side thereof.

The front body case 1130c covers a front side of the frame 1110, and is formed in the C shape having the front groove 120 and a front insertion hole 1131 in which the residue discharging port 513 is inserted.

The rear body case 1130d covers the rear side of the frame 1110 and is formed in the C shape having the rear groove 140 and a rear insertion hole 1133 in which the residue discharging port is inserted.

The upper body case 1130e covers the upper side of the frame 1110 and has the material introducing port 111.

The lower body case 1130f covers the lower side of the frame 1110.

As illustrated in FIG. 7, a rib 135 configured to fix a position of the reinforcing member 1110d is formed in the left and right body cases 1130a and 1130b to have an L shape.

A PCB 900 is installed as the control part at inner upper portions (corresponding to the upper flange) of the left and right body cases 1130a and 1130b.

A plurality of ribs 1139 configured to support a lower surface of the motor 310 of the driving part 300 are formed at the rear body case 1130d.

The motor 310 is supported in the form of a cantilever by the frame 1110, and preferably supported by the plurality of ribs 1139.

A cover 1137 configured to open and close the material introducing port 111 is slidably installed at the upper body case 1130e. That is, when the cover 1137 is slid from a state of FIG. 4 to the front side, a hopper portion of the material introducing port 111 is covered as illustrated in FIG. 5.

Meanwhile, as illustrated in FIG. 4, a separate removable material introducing port 113 may be further inserted into the material introducing port 111.

When materials introduced therein or other foreign substances are caught in the removable material introducing port 113, the removable material introducing port 113 may be separated and then easily washed.

Further, a detecting sensor (not shown) configured to prevent an operation when the removable material introducing port 113 is separated may be further installed.

The detecting sensor (not shown) may include a metal piece and a Hall sensor for detecting the metal piece, wherein the metal piece and the Hall sensor may be installed at the removable material introducing port 113 and at the material introducing port 111 or vice versa.

The detecting sensor (not shown) inputs a signal indicating whether the removable material introducing port 113 is separated to the control part 900.

Figure 16:
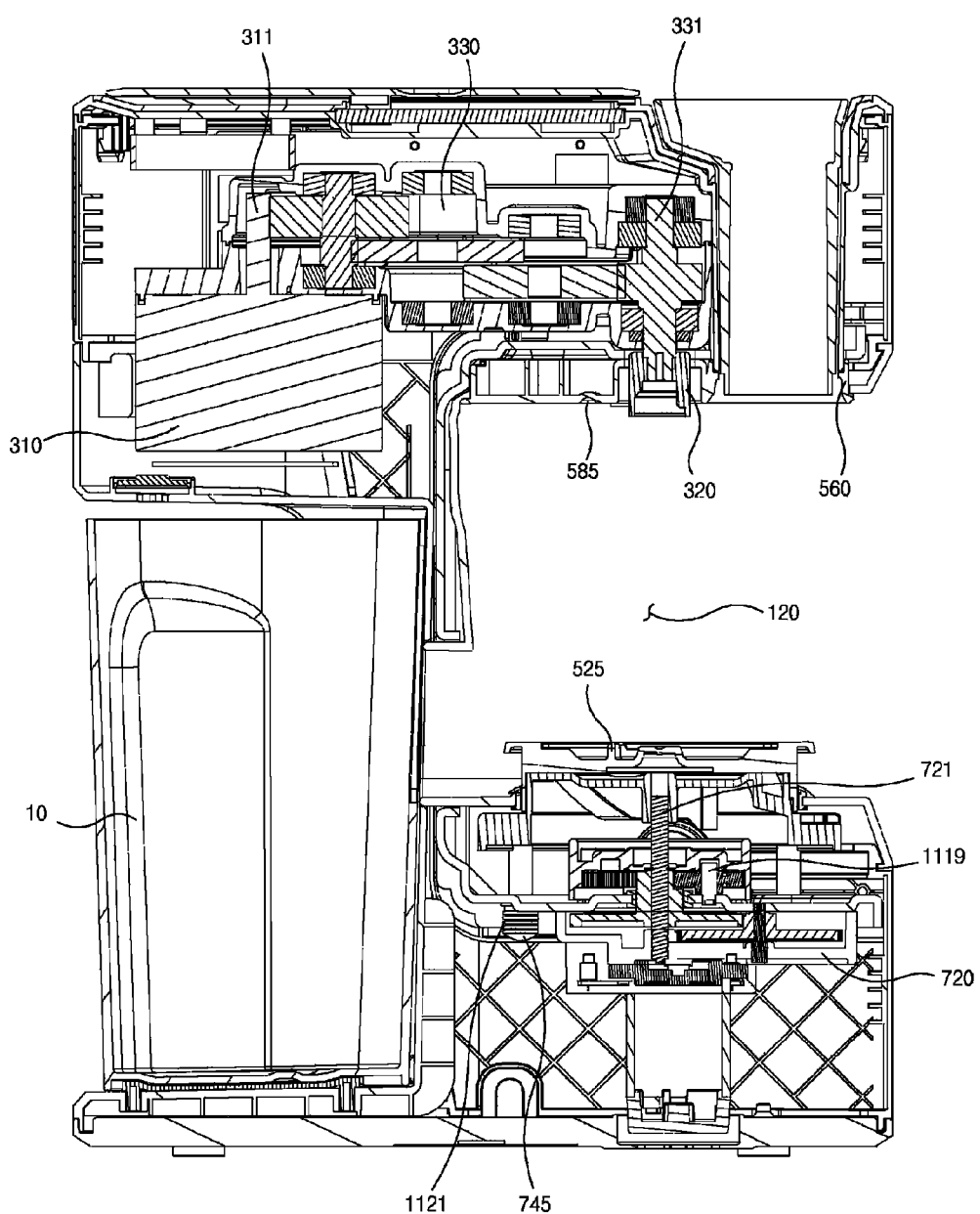
FIG. 16 is a cross-sectional view illustrating a state in which the extracting part is removed from FIG. 4.

As illustrated in FIGS. 3 and 16, the driving part 300 includes a reduction gear part 330 having a driving shaft 320, and a motor 310 supported by the reduction gear part 330 to transmit power. A rotating shaft 311 of the motor 310 is a driving gear which transmits the power to the reduction gear part 330.

The rotating shaft 311 of the motor 310 is a spline output shaft that is installed vertically, and an electrically driven part configured to rotate the rotating shaft 311 is installed at a lower end thereof.

The reduction gear part 330 may be a gear train engaged with each of multi-stage rotating shafts.

That is, the gear train includes a first reduction gear part 330a, a second reduction gear part 330b, a third reduction gear part 330c and a fourth reduction gear part 330d.

The first reduction gear part 330a includes a first rotating shaft 331a disposed to be parallel with the rotating shaft 311, and a 1-1th gear 333a and 1-2th gear 335a installed on the first rotating shaft 331a.

The 1-1th gear 333a has a much larger pitch circle than the 1-2th gear 335a.

The 1-1th gear 333a is engaged with the rotating shaft 311. The second reduction gear part 330b includes a second rotating shaft 331b, and a 2-1th gear 333b and 2-2th gear 335b installed on the second rotating shaft 331b.

The 2-1th gear 333b has a much larger pitch circle than the 2-2th gear 335b.

The 2-1th gear 333b is engaged with the 1-2th gear 335a. The third reduction gear part 330c includes a third rotating shaft 331c, and a third gear 333c installed on the third rotating shaft 331c.

The third gear 333c has a much larger pitch circle than a fourth gear 335c to be described later.

The third gear 333c is engaged with the 2-2th gear 335b.

The fourth reduction gear part 330d includes a fourth rotating shaft 331, and a fourth gear 335d installed on the fourth rotating shaft 331.

The fourth gear 335d is engaged with the third gear 333c.

The fourth rotating shaft 331 of the reduction part 330 is an output rotating shaft, and the driving shaft 320 is installed at a lower end of the output rotating shaft.

The driving shaft 320 has tooth-shaped protrusions formed on an inner circumferential surface of a cylinder thereof to be spaced at regular intervals.

Figure 23:
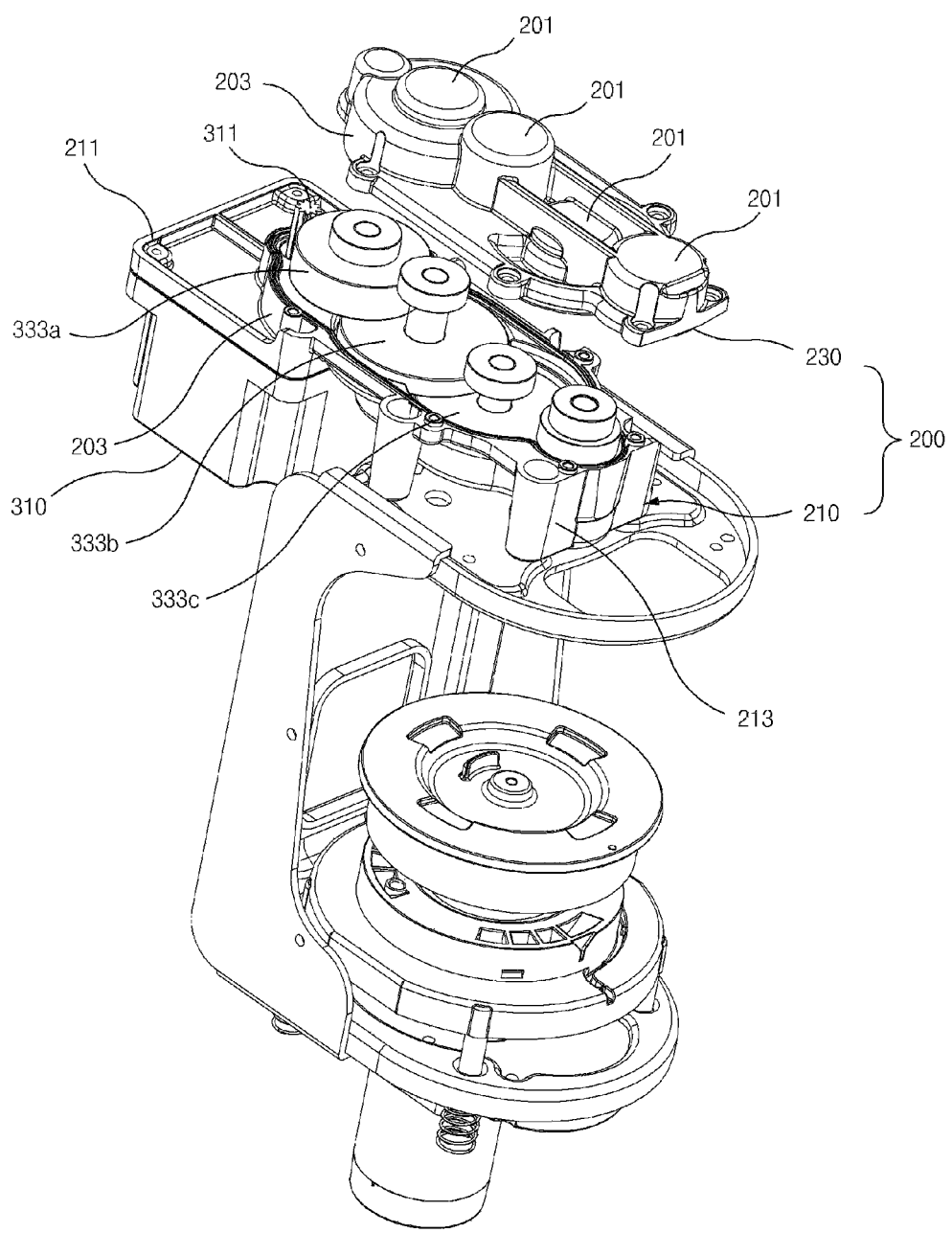
FIG. 23 is a perspective view illustrating a state in which an upper casing is separated from the driving part.

The driving part 300 and the reduction gear part 330 are mounted on a casing 200. (As illustrated in FIG. 23, the casing 200 includes a lower casing 210 and an upper casing 230.

The lower casing 210 includes a supporting plate 311 configured to support the electrically driven part of the motor 310, and a mount casing 213 on which the rotating shaft 311 and the reduction gear part 330 are mounted.

The upper casing 230 serves as a cover configured to cover an upper portion of the mount casing 213.

Further, a bearing or a bush B is installed at both ends of the first rotating shaft 331a, the second rotating shaft 331b, the third rotating shaft 331c and the output rotating shaft 3331

The casing 200 has a groove 201 in which the bearing or the bush B is installed, and grooves 203 configured to receive each reduction gear.

That is, each of the grooves 201 and 203 is formed in a circular shape.

The lower casing 210 of the reduction gear part 330 is coupled and installed at an upper portion of the upper frame 1110a.

The motor 310 is fastened to one side of the reduction gear part 330 and supported in the form of the cantilever.

In particular, the motor 310 may be preferably configured with a BL motor of which a speed may be controlled according to the material (a hardness of the material).

For example, a speed selecting switch such as a first speed (for vegetables), second speed (for fruits) and reverse rotation may be provided so that the motor 310 may be controlled through the control part 900. Therefore, vegetables may be extracted at the first speed, and fruits may be extracted at the second speed, and thus it is possible to provide excellent extracting efficiency, flavor, and energy efficiency. In the case in which a motor having a constant speed is used, if vegetables are extracted well at that speed, fruits are insufficiently extracted, and if fruits are extracted well at that speed, excessive pressure is applied to vegetables, and thus an energy loss and destruction of flavor may occur.

Of course, the control part 900 may measure an extracting force while the material is extracted, and may automatically select the speed of the motor 310 according to the material.

Figure 13:
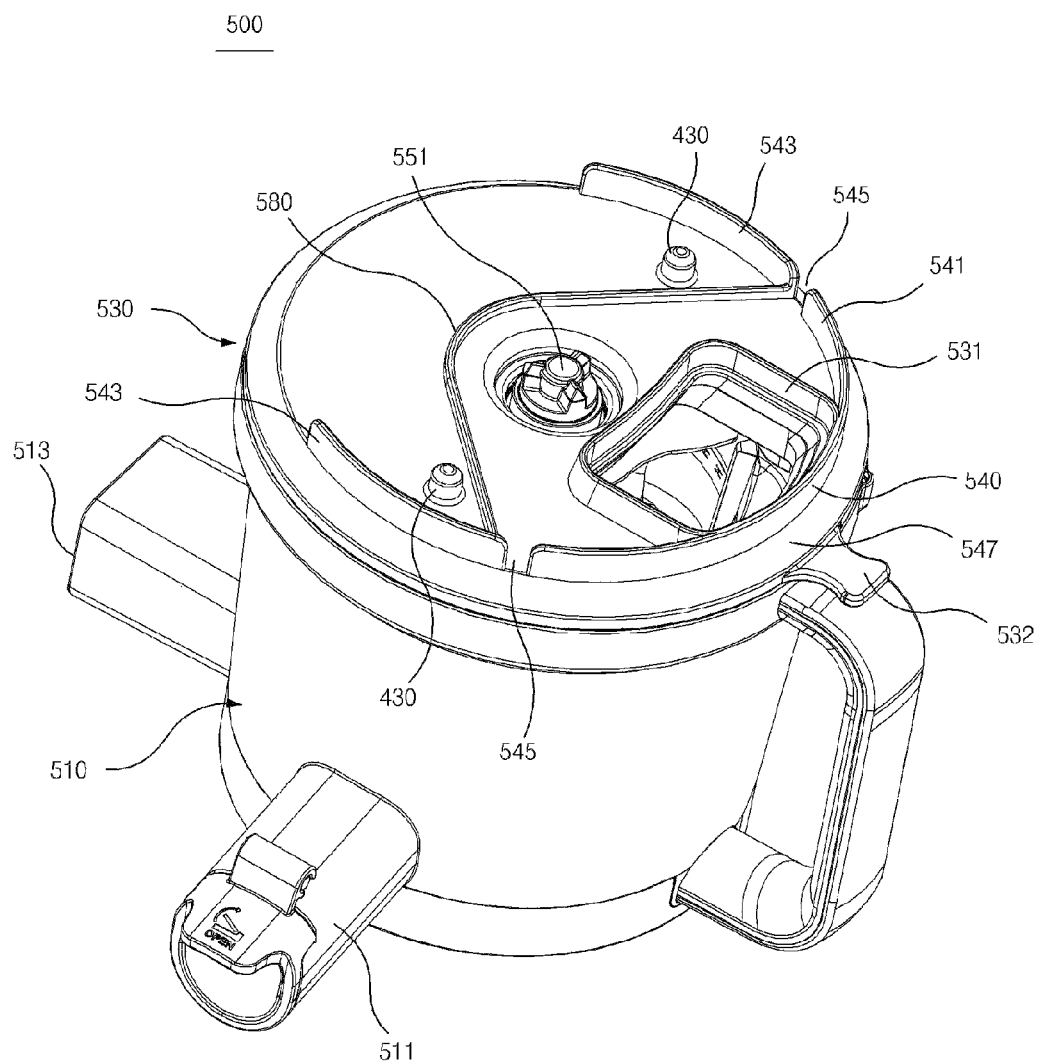
FIG. 13 is a perspective view of an extracting part.
Figure 14:
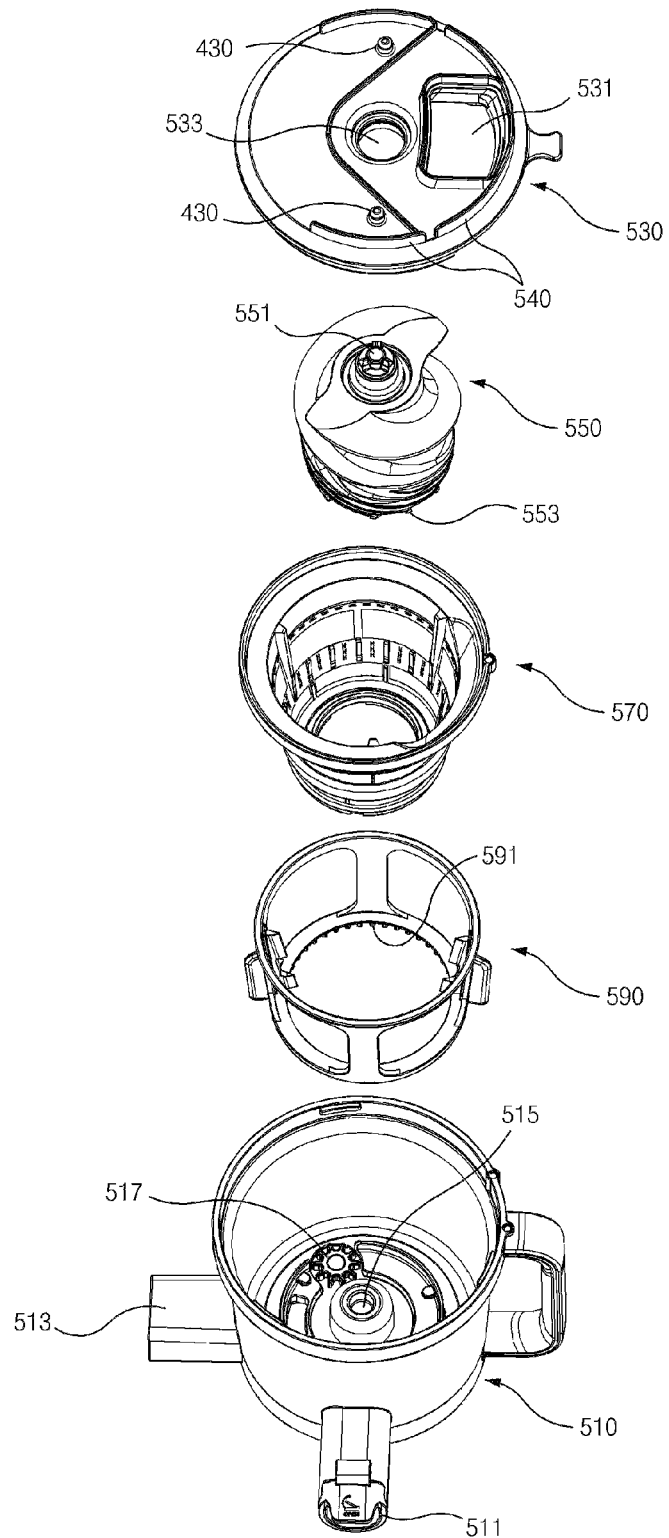
FIG. 14 is an exploded perspective view of the extracting part of FIG. 13.
Figure 15:
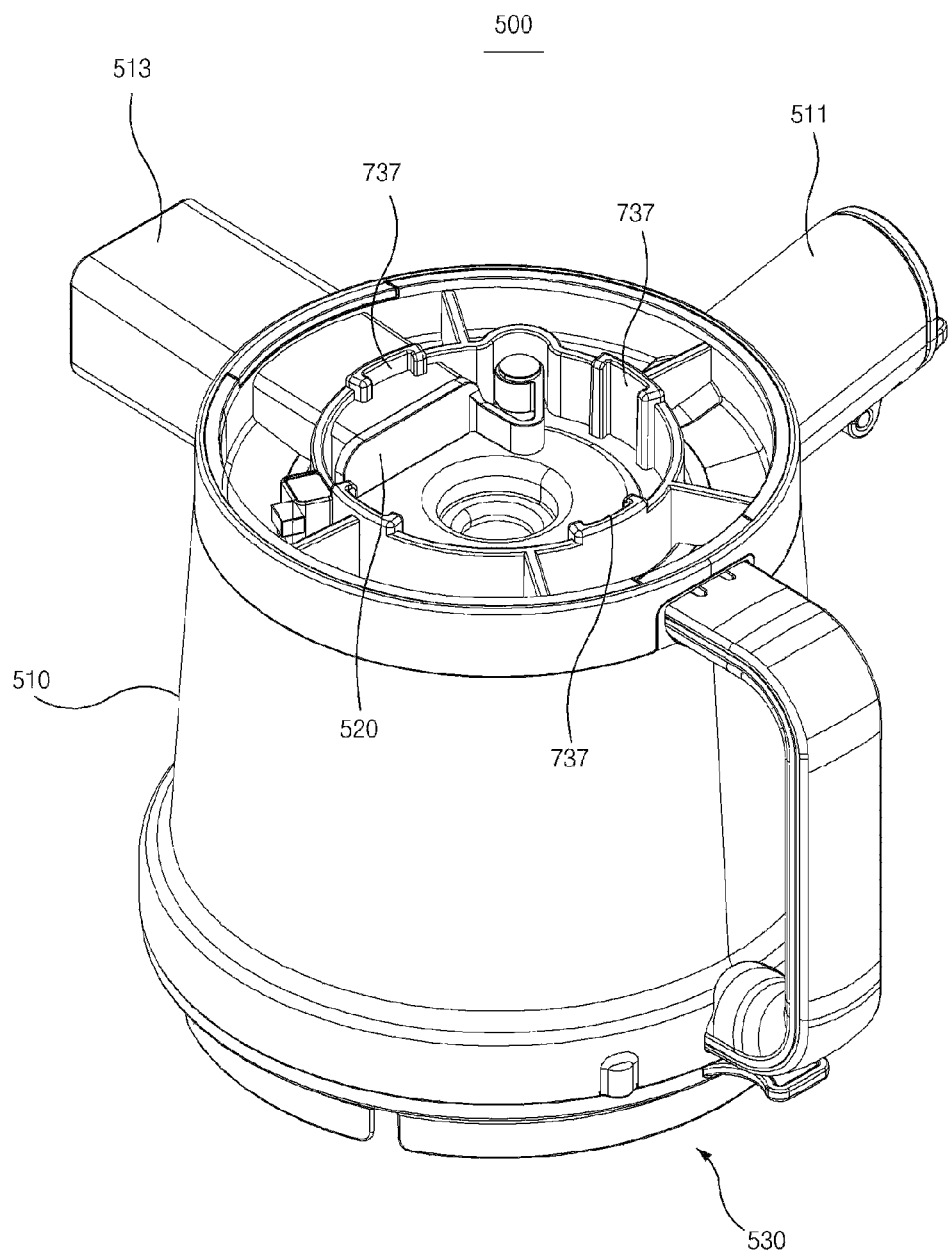
FIG. 15 is a bottom perspective view of FIG. 13.

As illustrated in FIGS. 13 to 15, the extracting part 500 includes a housing 510 having a juice discharging port 511 and the residue discharging port 513, a cover 530 coupled to an upper surface of the housing 510, a screw 550 of which a lower end is supported by a groove 515 formed in a bottom of the housing 510 and an upper end is rotatably supported by a through-hole 533 of the cover 530, a net drum 570 disposed between the screw 550 and the housing 510, and a rotating brush 590 rotatably disposed between the housing 510 and the net drum 570.

A driven shaft 551 engaged with the driving shaft 320 is formed at an upper end of the screw 550. The driven shaft 551 has protrusions formed to be spaced at regular intervals and thus to be engaged with the driving shaft 320.

Like the embodiment, the driving shaft 320 and the driven shaft 551 may be engaged with each other in a tooth form, and also may be engaged with each other in a socket and wrench form, i.e., a polygonal form.

The cover 530 has a communication port 531 inserted so as to be in communication with the material introducing port 111.

Therefore, when the extracting part 500 is moved up, the driven shaft 551 is engaged with the driving shaft 320, and the communication port 531 is inserted into the material introducing port 111.

More specifically, a protruding wall which protrudes upward is formed around the communication port 531. The protruding wall is inserted into the material introducing port 111.

In particular, as illustrated in FIG. 3, the communication port 531 is inserted between a lower end of the material introducing port 111 and a lower end of the removable material introducing port 113 so as to completely prevent the introduced material from leaking to an outer side.

A cover handle 532 is formed at the cover 530 to protrude outward and thus to provide convenience in a coupling or separating operation.

The rotating brush 590 is rotated as follows.

When the screw 550 is rotated, a tooth 553 formed at a lower side of the screw 550 is engaged with a gear 517 installed at the bottom of the housing 510 to rotate the rotating brush 590.

When the gear 517 is rotated, the gear 517 is engaged with a tooth 591 formed at an edge of a lower end of the rotating brush 590 and thus the rotating brush 590 is rotated.

That is, since the tooth 553 is engaged with the gear 517, and the gear 517 is engaged with the tooth 591, rotation of the screw 550 is transmitted to the rotating brush 590 through the gear 517 and thus the rotating brush 590 is rotated.

Meanwhile, the driven shaft 551 and the driving shaft 320 are controlled according to up and down movement of the lifting part 700, like a jaw clutch.

Therefore, if an engagement position therebetween is not accurate, a motor 710 of the lifting part 700 to be described later is overloaded, and also it is inconvenient for a user to manually turn the driven shaft 551 or the driving shaft 320 to engage them with each other.

To this end, when the driven shaft 551 is not engaged with the driving shaft 320 and the extracting part 500 is moved up, the control part 900 serves to move the extracting part 500 down, to slightly rotate the driving shaft 320 according to rotation of the motor 310, and thus to control the engagement position.

That is, an upward movement limit switch 600 and a downward movement limit switch 610 may be further installed at the lifting part 500.

Therefore, since the upward movement limit switch 600 is in an OFF state when the driven shaft 551 is not engaged with the driving shaft 320, if a period of time of the OFF state arrives at a preset time, the control part 900 controls the motor 710 to move the lifting part 700 down and then controls the motor 310 of the driving part 300.

Meanwhile, as illustrated in FIGS. 6 and 13, a guide protrusion 430 is formed at left and right sides of an upper surface of the cover 530, and an insertion groove 410 in which the guide protrusion 430 is inserted is formed in a lower surface of an upper cover of the front groove 120.

Therefore, the guide protrusion 430 serves to check whether the cover 530 is accurately coupled to the housing 510 and also to support the cover 530 when the screw 550 is rotated.

Referring to FIGS. 18a to 21, the lift part 700 includes the lifting motor 710, a seating part 730 on which the extracting part 500 is seated, a cam part 750 which moves the seating part 730 up and down, and a power transmitting part 770 which transmits power of the lifting motor 710 to the cam part 750.

The lifting motor 710 is a DC motor controlled by the control part 900, and is installed at a lower surface of the lower frame 1110b.

Figure 19:
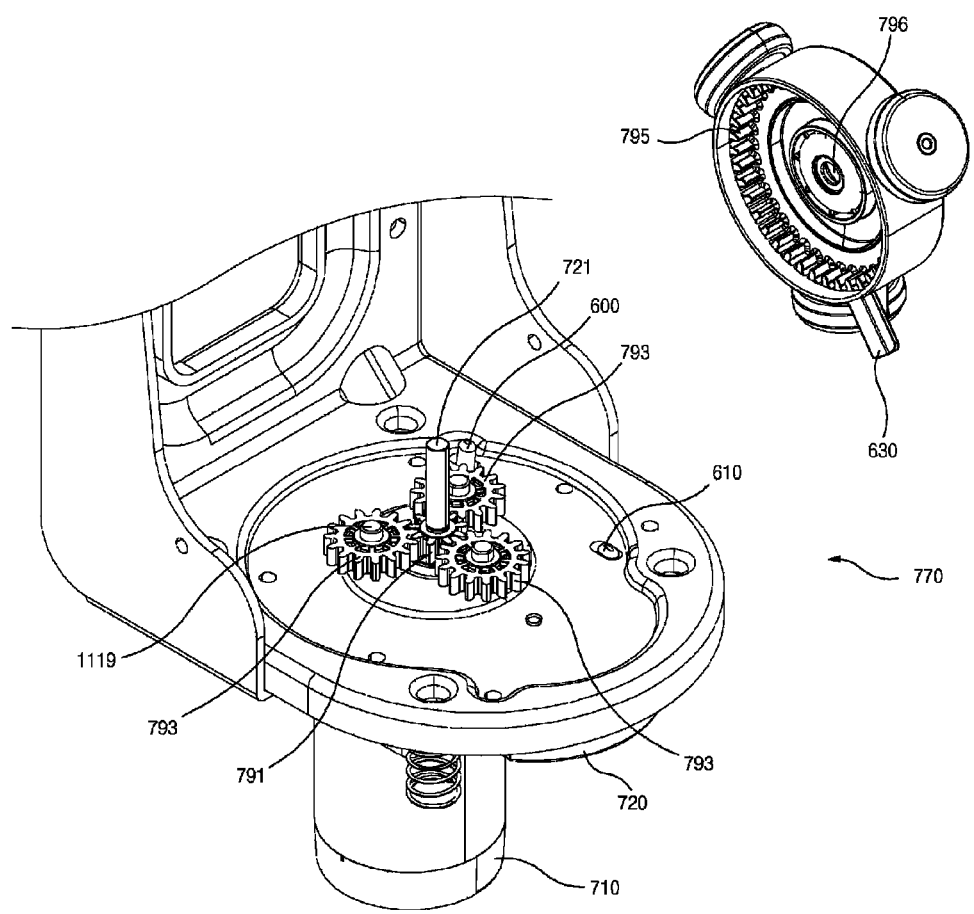
FIG. 19 is a perspective view illustrating a state in which a ring gear is separated from FIG. 18 to show a planet gear.
Figure 20:
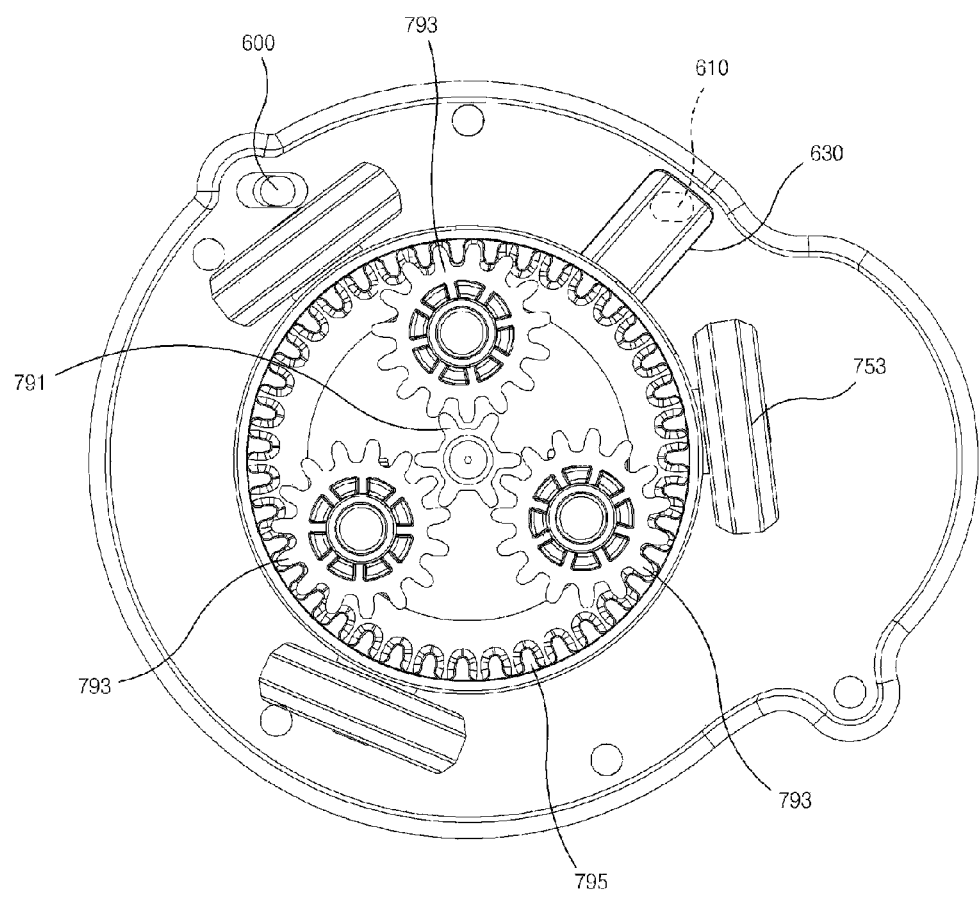
FIG. 20 is a plan view illustrating the planet gear and a lifting limit switch.

The power transmitting part 770 includes planet gear 790 which receives the power of the lifting motor 710. As illustrated in FIGS. 19 and 20, the planet gear 790 includes a sun gear 791, a planet pinion 793 engaged with the sun gear 791, and a ring gear 795 as an internal gear engaged with the planet pinion 793.

The sun gear 791 is rotatably installed on an output shaft 721 of a reduction gear 720 which receives and transmits the power of the lifting motor 710 to the sun gear.

Like the lifting motor 710, the reduction gear 720 is also installed at the lower surface of the lower frame 1110b.

The output shaft 721 is exposed upward through the fourth through-hole 1117 of the lower frame 1110b.

The planet pinion 793 is rotatably installed at a pin 1119 of the lower frame 1110b.

A lower surface of the ring gear 795 is opened, and a through-hole 796 is formed in a center of an upper plate 795a so that the output shaft 721 is inserted and passes therethrough.

Further, a groove in which the pin 1119 is inserted is formed at the lower surface of the upper plate 795a of the ring gear 795, such that the planet gear 790 is prevented from escaping upward.

The cam part 750 includes a cam 751 formed at the lower surface of the seating part 730, and a roll part 753 installed at an outer circumferential surface of the ring gear 795 to be rolled along the cam 751 according to rotation of the ring gear 795.

Figure 18A:
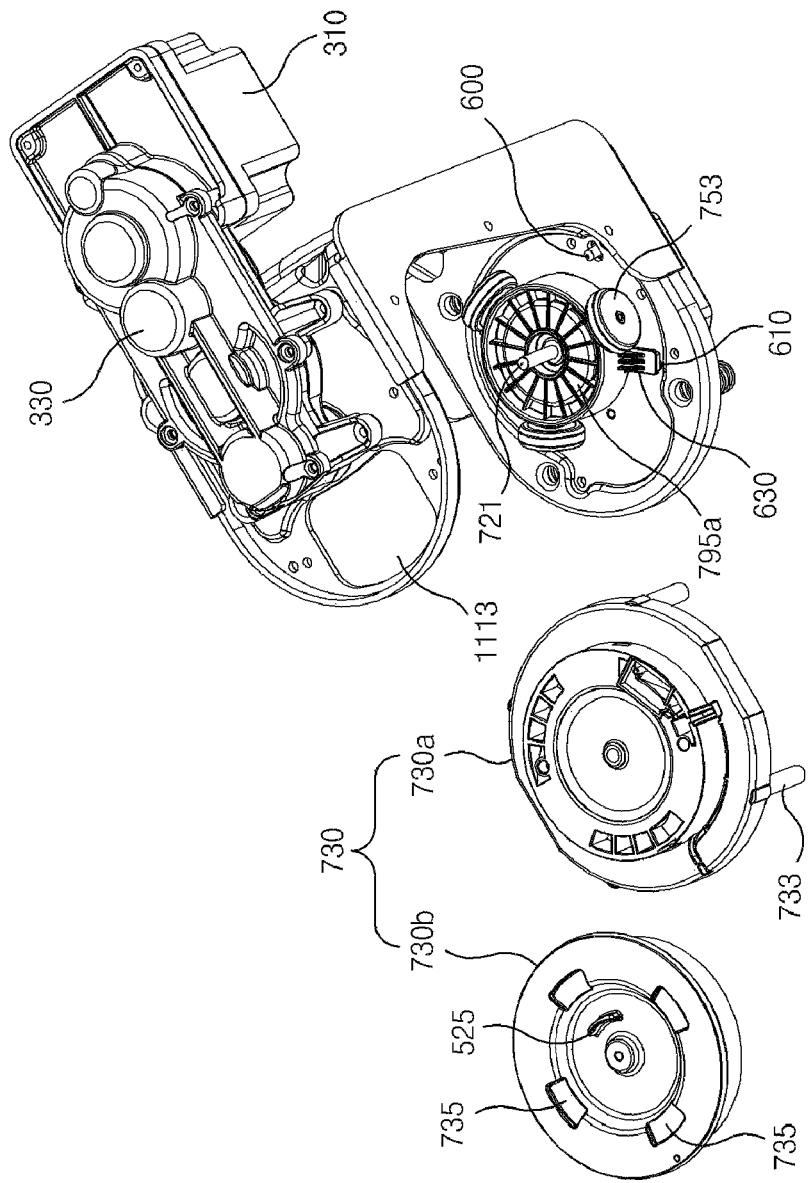
FIGS. 18A and 18B are top and bottom perspective views illustrating a state in which a seating part is separated from the frame assembly.
Figure 18B:
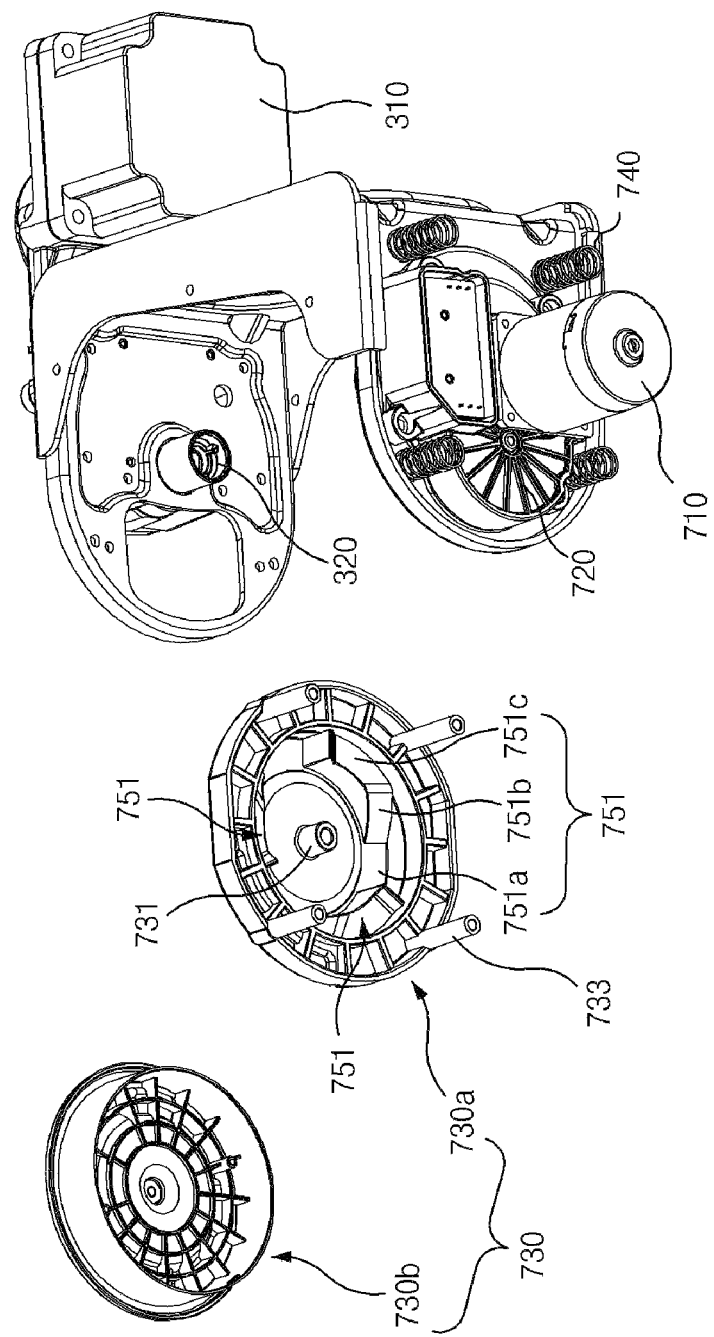
Figure 21:
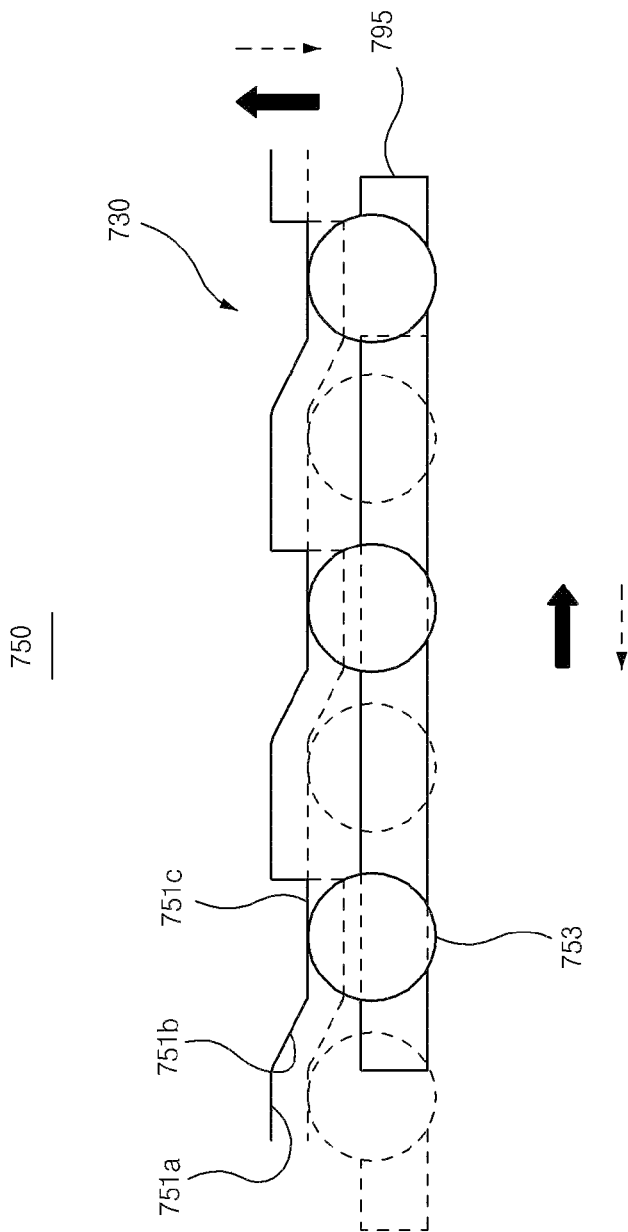
FIG. 21 is a development view illustrating a state in which the seating part is moved up and down while a rolling part is rolled along a cam.
Figure 22:
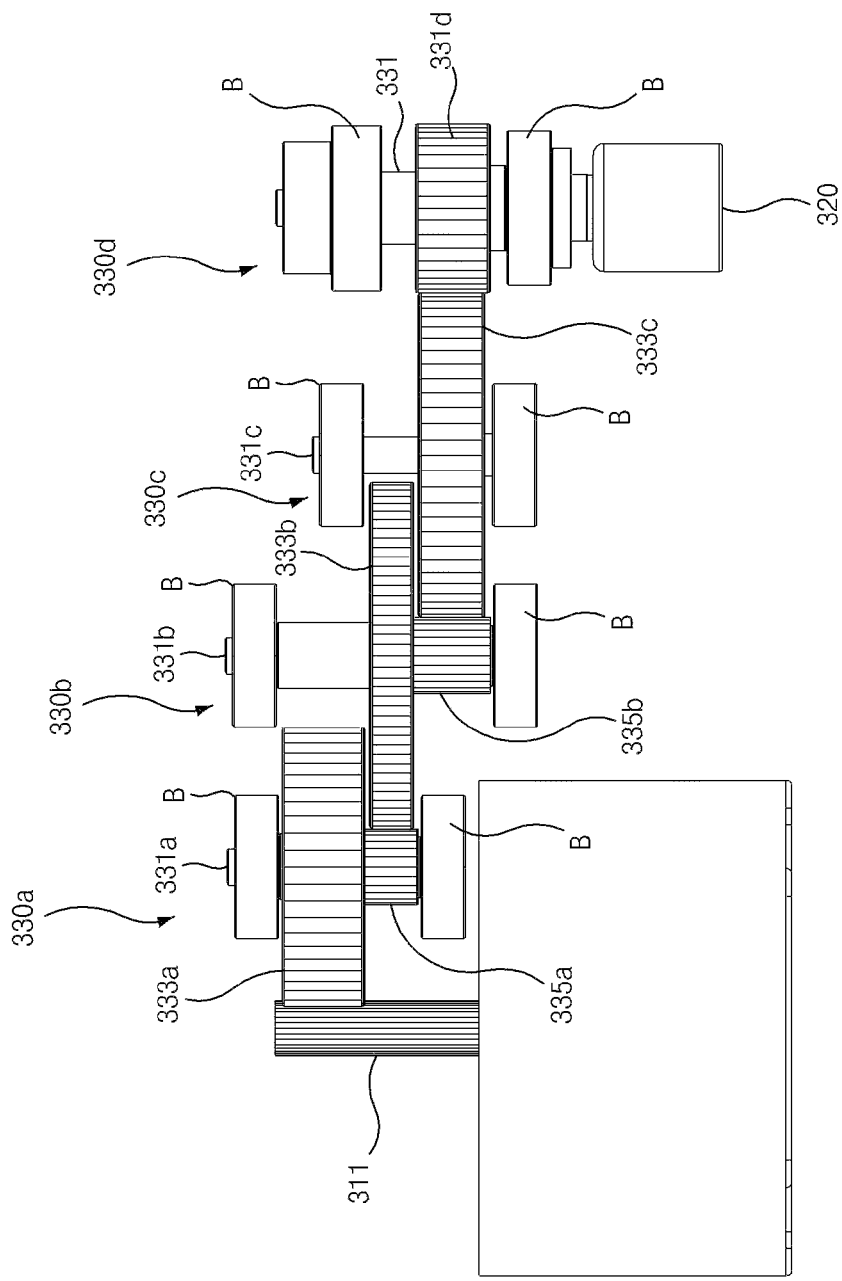
FIG. 22 is a schematic side view illustrating an arrangement of a driving part.

As illustrated in FIGS. 18b and 21, the cam 751 includes a moving-down part 751a, a moving-up part 751c located lower than the moving-down part 751a, and an inclined part 751b configured to extend from the moving-down part 751a to the moving-up part 751c.

Therefore, as illustrated in FIG. 21, when the ring gear 795 is rotated in direction of a solid line, the roll part 753 is rolled to push up the moving-up part 751c, and thus the seating part 730 is moved up.

On the other hand, when the ring gear 795 is rotated in a direction of a dotted line, the roll part 753 is rolled along the moving-up part 751c and the inclined part 751b and located at the moving-down part 751a, and thus the seating part 730 is moved down.

As illustrated in FIG. 20, an operation piece 630 configured to operate the upward movement limit switch 600 and the downward movement limit switch 610 is formed at the ring gear 795.

The upward movement limit switch 600 and the downward movement limit switch 610 are electrically connected with the control part 900.

When the operation piece 630 presses and turns on the upward movement limit switch 600, upward movement of the extracting part 500 is stopped, and when the operation piece 630 presses and turns on the downward movement limit switch 610, downward movement of the extracting part 500 is stopped.

The seating part 730 includes a cam forming part 730a in which the cam 751 is formed, and a seating cover part 730b which is coupled to an upper surface of the cam forming part 730a.

A groove 731 in which an upper side of the output shaft 721 is rotatably inserted and supported is formed at a center of the cam forming part 730a.

Further, a pillar 733 inserted into the downward protruding pipe 1121 of the lower frame 1110b is formed at an edge of the cam forming part 730a to extend downward.

The pillar 733 is partially exposed downward from the downward protruding pipe 1121.

Further, a spring 740 configured to apply an elastic force so as to pull the seating part 730 downward with respect to the main body 100 may be further installed.

The spring 740 serves to pull the seating part 730 to a moved-down position. The spring 740 is inserted into the downward protruding pipe 1121, and then a bolt 745 is fastened to a lower end of the pillar 733, such that the spring 740 is supported between a lower surface of the lower frame 1110b and a head portion of the bolt 745.

Therefore, since the spring 740 pulls the bolt 745 downward with respect to the frame 1110, the seating part 730 is biased toward the moved-down position by the elastic force and thus forcibly further moved down. (Since a compulsory force by which the roll part pushes the cam up is applied when the seating part is moved up, there is no problem when the seating part is moved up, but if only a force of gravity is applied while the seating part is moved down, the seating part may not be rapidly and accurately moved down. Thus, the spring is prepared for this reason.)

The seating cover part 730b is fitted to the cam forming part 730a, and has a seating position groove 735 formed in an upper surface thereof.

A seating position protrusion 737 formed at the lower surface of the housing 510 of FIG. 15 is located in the seating position groove 735.

Further, a residue discharge control packing 520 inserted into an entrance of the residue discharging port 513 is inserted into the lower surface of the housing 510.

An interference protruding piece 525 which causes interference when the residue discharge control packing 520 is separated is formed at an upper surface of the seating cover part 730b.

As illustrated in FIG. 3, the residue discharge control packing 520 is pushed downward according to an amount of the residue at the entrance of the residue discharging port 513, and thus controls a discharging speed.

If a seating operation is performed without the residue discharge control packing 520, the residue leaks. Therefore, when the separated residue discharge control packing 520 is located on the interference protruding piece 525, the extracting part 500 is not seated accurately, and thus the user may easily recognize it.

Meanwhile, as illustrated in FIGS. 13 and 14, a sill portion 540 which protrudes upward is formed around an upper surface of a front side of the cover 530.

As illustrated in FIG. 13, the sill portion 540 includes a first sill portion 541 installed at part of a circumference, and second sill portions 543 formed to be spaced a predetermined distance from both ends of the first sill portion 541.

A drain way 545 is formed as a groove corresponding the predetermined distance between the first and second sill portions 541 and 543.

Figure 17A:
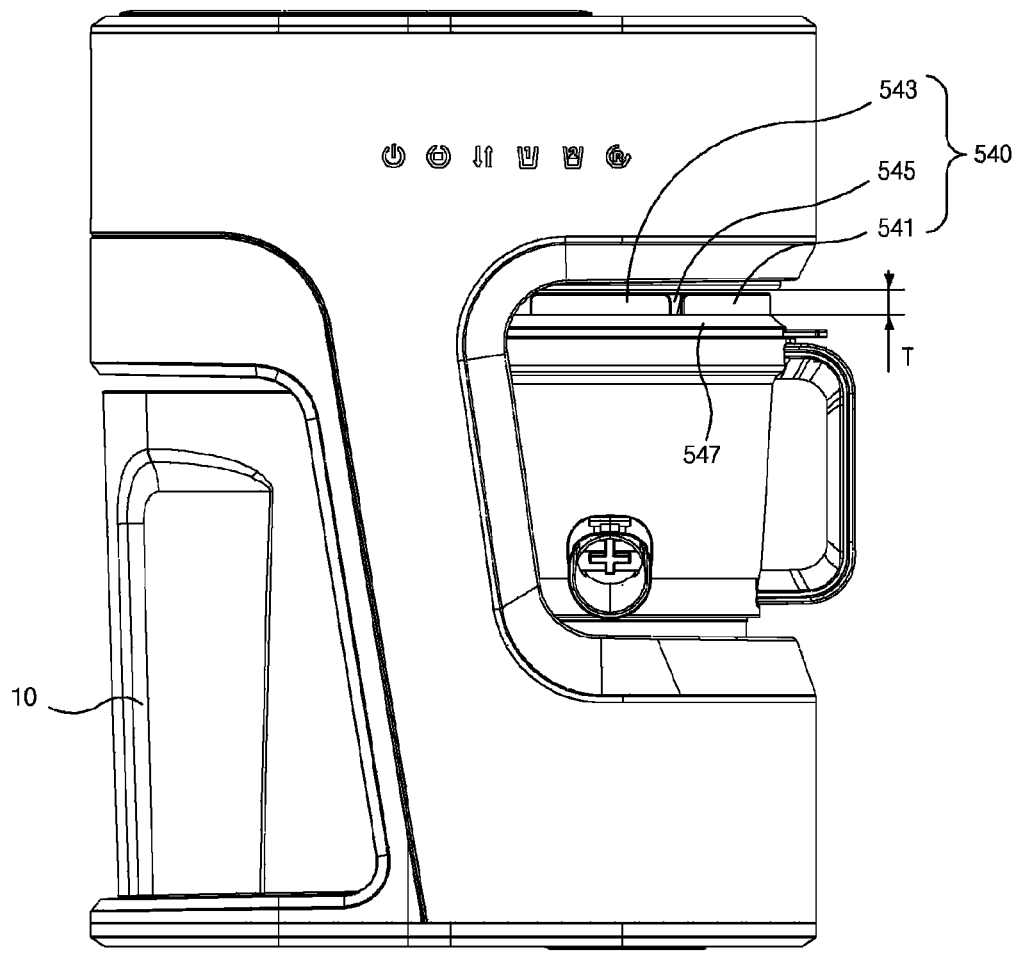
FIGS. 17A and 17B are side views illustrating states before and after the extracting part is move up.
Figure 17B:
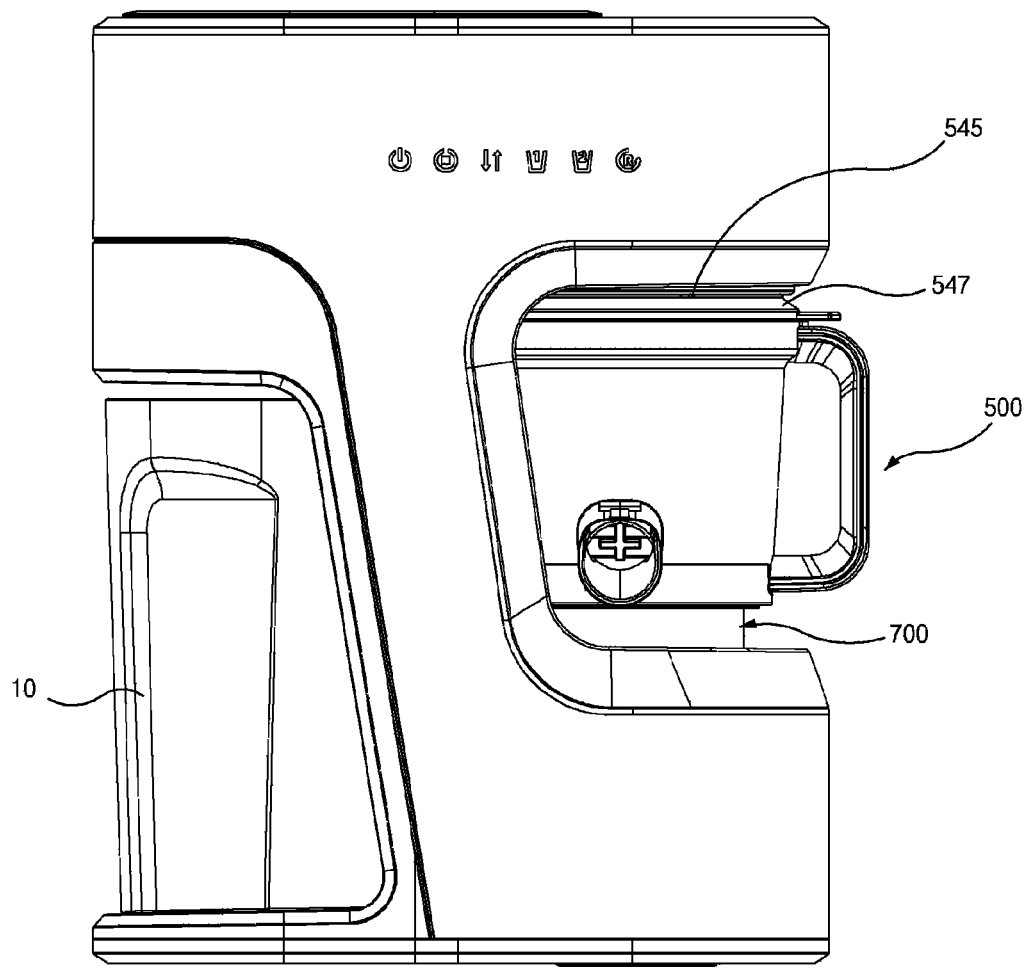

As illustrated in FIG. 17a, the first and second sill portions 541 and 543 serve to block between an upper side of the front groove 120 and the upper surface of the cover 530 before the extracting part 500 is moved up, and thus to prevent the extracting part 500 from being moved up while a user's finger or the like is inserted therebetween.

Further, an edge of the cover 530 is formed to have an inclined surface 647 which is gradually inclined outward from top to bottom.

The inclined surface 547 serves to allow the finger to be easily moved down therealong even when the finger is caught in the sill portion 540.

The sill portion 540 is inserted into a sill insertion groove 560 formed at an upper side of the front groove 120, such that the drain way 545 is slightly exposed when the extracting part 500 is moved up.

Meanwhile, a partition plate 580 which partitions the upper surface of the cover 530 into front and rear sides may be formed on the upper surface of the cover 530 to protrude upward.

The through-hole 533 of the cover 530 is disposed between the partition plate 580 and the sill portion 540, more specifically the first sill portion 541.

Further, both ends of the partition plate 580 are connected with both ends of the second sill portions 543 to form the drain way 545.

The partition plate 580 is formed in a V shape to be guided to the drain way 545.

Therefore, the partition plate 580 and the first sill portion 541 serve as a dam, such that a liquid leaking through the through-hole 533 is drained to only the drain way 545 and thus prevented from permeating into the main body 100 or from flowing to other corners, and thus the washing operation is easy.

The partition plate 580 is inserted into a plate insertion groove 585 formed at the upper side of the front groove 120.

Since the residue discharging port of the extracting part is inserted into the center flange configured to connect the upper portion with the lower portion, and the residue container is disposed at the rear side of the upper and lower portions and the center flange, the residue container and the juice container can be conveniently used while spaced from each other on the same plane.

In particular, since the C-shaped frame in which the driving part is mounted at the upper side thereof and the lifting part is mounted at the lower side thereof is installed in the main body, the frame can resist up and down reaction forces generated during the extracting operation, and the deformation of the main body is prevented, and thus the extractor can be stably operated.

Meanwhile, since the speed of the motor which transmits the rotational power to the screw can be controlled, optimal speeds for both vegetables and fruits can be provided.

Also, since the sill portion which protrudes upward is formed around the upper surface of the front side of the cover, a gap formed at the upper side of the front groove is blocked by the sill portion, even when the extracting part is moved up, and thus fingers are completely prevented from being caught therein.

Also, since the edge of the cover 530 is formed to have the inclined surface which is gradually inclined outward from top toward bottom, fingers can be easily moved down along the inclined surface and then released, even when slightly caught therein.

Also, since the partition plate which partitions the upper surface of the cover into front and rear sides is formed on the upper surface of the cover to protrude upward, the drain way is formed between both ends of the partition plate and both ends of the sill portion, and the liquid leaking through the through-hole is drained to only the front side, but not to the rear side, and thus prevented from flowing down on the main body or the like, and thus the washing operation is easy.

Also, since the sill insertion groove and the plate insertion groove corresponding to the sill portion and the partition plate are formed at the upper side of the front groove, the extracting part can be completely moved up and another portion other than the drain way can be also sealed.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. An upper driving type juice extractor comprising:
   a main body comprising a horizontal upper body and a center body which connects the horizontal upper body with a lower body;
   a driving part disposed in the horizontal upper body;
   an extracting part being inserted and pulled out via a front groove of the main body, separately discharging juice and residues, wherein the driving part is configured to drive the extracting part;
   a lifting part which is installed in the lower body and configured to move the extracting part up and down with respect to the driving part; and
   a frame for the main body including:
      an upper frame having a first through-hole in which a driving shaft of the driving part is inserted and a second through-hole in which a material introducing port of the horizontal upper body is inserted;
      a lower frame having a fourth through-hole in which a rotating shaft of the lifting part is inserted from bottom to top; and
      a connection frame which connects the upper frame with the lower frame and has a third through-hole in which a residue discharging port of the extracting part is inserted, wherein the frame for the main body is formed as C-shaped with respect to a cross-sectional view and the extracting part is inserted and removed between the upper frame and the lower frame.

2. The juice extractor according to claim 1, wherein the lifting part of the upper driving type juice extractor includes a lifting motor, a seating part on which the extracting part is seated, a cam part which moves the seating part up and down, and a planet gear which transmits the power of the lifting motor to the cam part; and
   the frame for a main body includes three pins formed to protrude from a circumferential surface of the fourth through-hole of the lower frame, and a plurality of protruding pipes formed at an edge of the lower frame to protrude downward; and a planet pinion of the planet gear is rotatably installed at the pin, and a pillar formed at an edge of a cam forming part to extend downward is inserted into at least one of the protruding pipes.

3. An upper driving type juice extractor comprising:
   a main body having a horizontal upper body and a center body which connects the horizontal upper body with a lower body;
   a driving part disposed in the horizontal upper body;
   an extracting part being inserted and pulled out via a front groove of the main body, separately discharging juice and residues, wherein the driving part is configured to drive the extracting part;
   a lifting part which is installed in the lower body and configured to move the extracting part up and down with respect to the driving part; and
   a frame assembly including an upper frame having a first through-hole in which a driving shaft of the driving part is inserted and a second through-hole in which a material introducing port of the horizontal upper body is inserted, a lower frame having a fourth through-hole in which a rotating shaft of the lifting part is inserted from bottom to top, and a connection frame which connects the upper frame with the lower frame, wherein the frame for the main body is formed as C-shaped when seen with respect to a cross-sectional view and the extracting part is inserted and removed between the upper frame and the lower frame.

4. The juice extractor according to claim 3, wherein the connection frame includes a third through-hole in which a residue discharging port of the extracting part is inserted, and the driving part includes:
- a reduction gear part having the driving shaft; and
- a motor supported by the reduction gear part so as to transmit power.

\* \* \* \* \*